(12) United States Patent
Zou et al.

(10) Patent No.: US 10,379,734 B2
(45) Date of Patent: Aug. 13, 2019

(54) SYSTEMS AND METHODS FOR INTERACTIVE IMAGE CARICATURING BY AN ELECTRONIC DEVICE

(71) Applicant: QUALCOMM Incorporated, San Diego, CA (US)

(72) Inventors: Xuan Zou, Shanghai (CN); Fan Ling, Shanghai (CN); Ning Bi, San Diego, CA (US); Lei Zhang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 14/764,149

(22) PCT Filed: Feb. 23, 2013

(86) PCT No.: PCT/CN2013/000179
§ 371 (c)(1),
(2) Date: Jul. 28, 2015

(87) PCT Pub. No.: WO2014/127494
PCT Pub. Date: Aug. 28, 2014

(65) Prior Publication Data
US 2016/0011769 A1    Jan. 14, 2016

(51) Int. Cl.
*G06K 9/00* (2006.01)
*G06F 3/0488* (2013.01)
(Continued)

(52) U.S. Cl.
CPC ...... *G06F 3/04883* (2013.01); *G06F 3/04845* (2013.01); *G06T 11/00* (2013.01);
(Continued)

(58) Field of Classification Search
None
See application file for complete search history.

(56) References Cited

U.S. PATENT DOCUMENTS

| 6,556,196 B1 | 4/2003 | Blanz et al. |
| 7,646,395 B2 | 1/2010 | Chatting et al. |

(Continued)

FOREIGN PATENT DOCUMENTS

| CN | 101692681 A | 4/2010 |
| CN | 101887593 A | 11/2010 |

(Continued)

OTHER PUBLICATIONS

Anonymous: "111.15.2.7. Undo History Dialog," GNU Image Manipulation Program, User Manual, Nov. 2, 2012 (Nov. 2, 2012), XP055321774, Retrieved from the Internet: URL:http://web.archive.org/web/20121102004511/http://docs.gimp.org/en/gimp-undo-dialog.html [retrieved on Nov. 22, 2016], 2 pages.

(Continued)

*Primary Examiner* — Stephen P Coleman
(74) *Attorney, Agent, or Firm* — Austin Rapp & Hardman, P.C.

(57) ABSTRACT

A method for interactive image caricaturing by an electronic device is described. The method includes detecting at least one feature location of an image. The method further includes generating, based on the at least one feature location, an image mesh that comprises a grid of at least one horizontal line and at least one vertical line. The method additionally includes obtaining a gesture input. The method also includes determining at least one caricature action based on the at least one gesture input. The method further includes generating a caricature image based on the image mesh, the at least one caricature action and the image.

46 Claims, 14 Drawing Sheets

(51) Int. Cl.
*G06F 3/0484* (2013.01)
*G06T 11/00* (2006.01)
*G06T 11/60* (2006.01)
*G06T 17/20* (2006.01)

(52) U.S. Cl.
CPC .............. *G06T 11/60* (2013.01); *G06T 17/20* (2013.01); *G06F 2203/04808* (2013.01)

(56) References Cited

U.S. PATENT DOCUMENTS

| | | | |
|---|---|---|---|
| 8,584,049 B1* | 11/2013 | Zhai | G06F 17/24 715/702 |
| 2010/0086215 A1* | 4/2010 | Bartlett | G06K 9/00335 382/197 |
| 2010/0095206 A1 | 4/2010 | Kim | |
| 2010/0328311 A1* | 12/2010 | Lakshmanan | G06K 9/00214 345/427 |
| 2011/0249961 A1 | 10/2011 | Brunner | |
| 2012/0113106 A1 | 5/2012 | Choi et al. | |
| 2012/0176401 A1 | 7/2012 | Hayward et al. | |
| 2012/0306874 A1* | 12/2012 | Nguyen | G06K 9/00208 345/420 |
| 2013/0039599 A1 | 2/2013 | Aoki et al. | |
| 2015/0131873 A1* | 5/2015 | Brandt | G06K 9/00295 382/118 |

FOREIGN PATENT DOCUMENTS

| | | |
|---|---|---|
| CN | 102306389 A | 1/2012 |
| CN | 102521867 A | 6/2012 |
| EP | 2343637 A2 | 7/2011 |
| JP | H09305780 A | 11/1997 |
| JP | H1010970 | 1/1998 |
| JP | 2011170541 A | 9/2011 |
| JP | 2011233073 A | 11/2011 |
| KR | 20040036831 A | 5/2004 |
| WO | 2010010342 A1 | 1/2010 |
| WO | 2013019404 A1 | 2/2013 |

OTHER PUBLICATIONS

Anonymous: "1.3.3. Undoing," GNU Image Manipulation Program, User Manual, Jan. 31, 2013 (Jan. 31, 2013), XP055321584, Retrieved from the Internet: URL:http://web.archive.org/web/20130131065734/http://docs.gimp.org/en/gimp-concepts-undo.html [retrieved on Nov. 22, 2016], 4 pages.
Brown R, "Adobe Photoshop Touch—Warp", 9 Nov. 1, 2011 (Nov. 1, 2011), p. 5 pp., XP054976932, Retrieved from the Internet: URL:http://www.photoshop.com/tutorials/11507 [retrieved on Nov. 22, 2016].
Igarashi T., et al., "Operation Method of 2D Shape Expressing Solidness of Object," Joint Symposium on Visual Computing Graphics and CAD 2005, Japan, The Institute of Image Electronics Engineers of Japan, The Information Processing Society of Japan, 2005, p. 103.
Supplementary European Search Report—EP13875827—Search Authority—Munich—dated Nov. 30, 2016.
Brennan S.E., "Caricature Generator," Massachusetts Institute of Technology, 1982, pp. 1-116.
Chiang P.Y., et al., "Automatic Caricature Generation by Analyzing Facial Features," Appear in Proceeding of 2004 Asia Conference on Computer Vision (ACCV2004), Korea, 2004, 6 pages.
Heckbert, Paul S., "Fundamentals of Texture Mapping and Image Warping", Master Thesis, UCB, 1989.
International Search Report and Written Opinion—PCT/CN2013/000179—ISA/EPO—dated Nov. 21, 2013.
Igarashi T et al., "As-Rigid-As-Possible Shape Manipulation", ACM Transactions on Graphics, vol. 24, No. 3, Jul. 1, 2005 (Jul. 1, 2005), pp. 1134-1141, XP055005196, ISSN: 0730-0301 . . . .
Supplementary European Search Report—EP13875827—Search Authority—Berlin—dated Sep. 5, 2016.

* cited by examiner

SYSTEMS AND METHODS FOR INTERACTIVE IMAGE CARICATURING BY AN ELECTRONIC DEVICE

TECHNICAL FIELD

The present disclosure relates generally to electronic devices. More specifically, the present disclosure relates to systems and methods for interactive image caricaturing by an electronic device.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cellular phones, smartphones, digital cameras, camcorders, computers, etc.) capture and edit pictures or images. For example, a smartphone may capture an image with an integrated image sensing device.

While capturing and editing pictures or images may be beneficial, such processes often are time-consuming and laborious. As can be observed from this discussion, systems and methods that add new and/or improved features of image editing may be beneficial.

DETAILED DESCRIPTION

Figure 1:
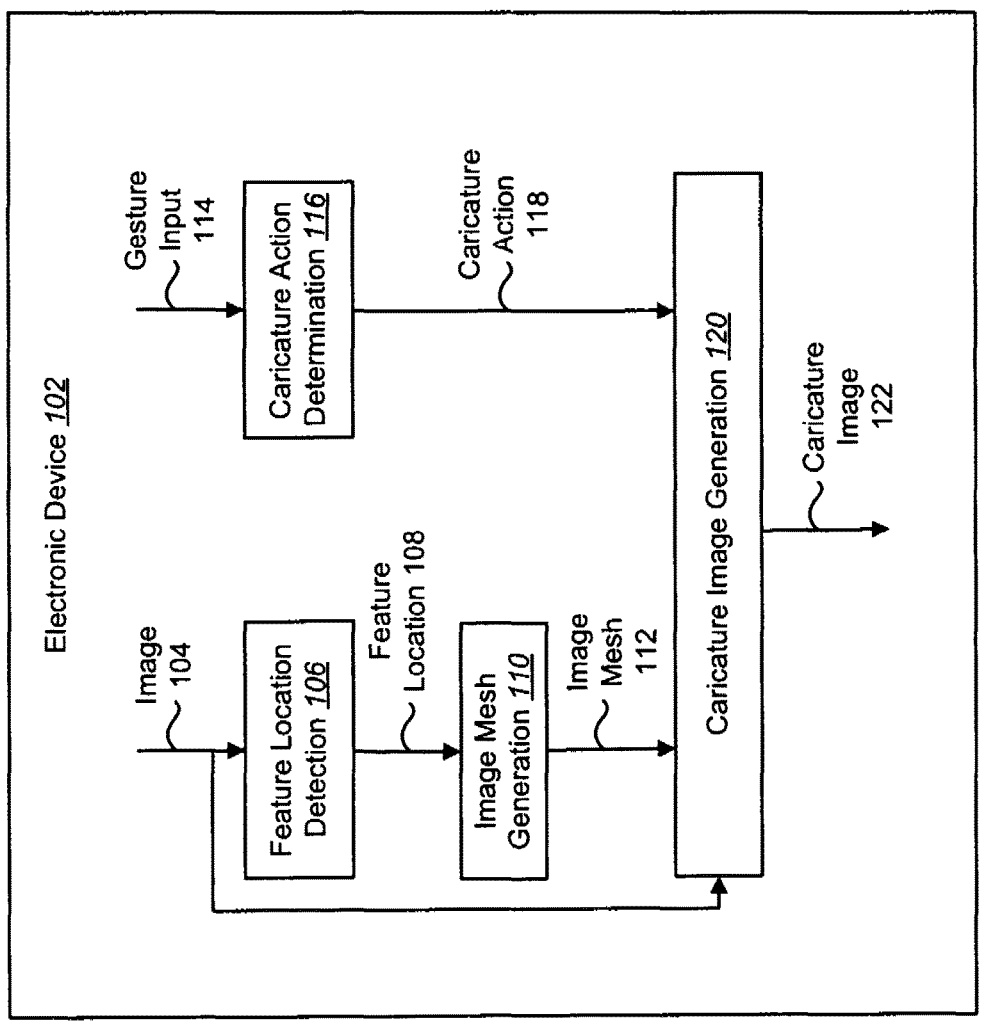
FIG. 1 is a block diagram illustrating one configuration of an electronic device in which systems and methods for interactive image caricaturing may be implemented.

A method for interactive image caricaturing by an electronic device is described. The method includes detecting at least one feature location of an image. The method also includes generating, based on the at least one feature location, an image mesh that comprises a grid of at least one horizontal line and at least one vertical line. The method also includes obtaining at least one gesture input. The method also includes determining at least one caricature action based on the at least one gesture input. The method further includes generating a caricature image based on the image mesh, the at least one caricature action and the image.

The image may be a face image. The vertices of the image mesh may correspond to the at least one feature location. The at least one gesture input may include a touch input. The method may include displaying at least one of the image and the caricature image. Generating a caricature image may include applying the at least one caricature action to the image.

The at least one character action may provide shifting information for at least one vertex of the image mesh. The at least one character action may also provide a pixel map that maps an image vertex pixel to a corresponding caricature image vertex pixel based on the shifting information. Generating a caricature image may include interpolating the location of other pixels in the caricature image based on the pixel map.

The method may include validating the at least one gesture input. Validating the at least one gesture input may include determining whether a motion of the gesture input is greater than a motion threshold.

The at least one gesture input may include multiple gesture inputs. The method may include determining the motion of the gesture inputs relative to one another. The method may include determining that the gesture inputs are horizontally aligned. The method may include determining that the gesture inputs are vertically aligned.

The method may include maintaining a caricature action list. The method may include adding the at least one caricature action to the caricature action list.

An electronic device for interactive image caricaturing is described. The electronic device includes feature location detection circuitry that detects at least one feature location of an image. The electronic device also includes image mesh generation circuitry coupled to the feature location detection circuitry. The image mesh generation circuitry generates, based on the at least one feature location, an image mesh that comprises a grid of at least one horizontal line and at least one vertical line. The electronic device also includes sensing circuitry that obtains at least one gesture input. The electronic device also includes caricature action determination circuitry coupled to the sensing circuitry. The caricature action determination circuitry determines at least one caricature action based on the at least one gesture input. The electronic device further includes caricature image generation circuitry coupled to the image mesh generation circuitry and the caricature action determination circuitry. The caricature image generation circuitry generates a caricature image based on the image mesh, the at least one caricature action and the image.

A computer-program product for interactive image caricaturing is described. The computer-program product includes a non-transitory tangible computer-readable medium having instructions. The instructions include code for causing an electronic device to detect at least one feature location of an image. The instructions also include code for causing the electronic device to generate, based on the at least one feature location, an image mesh that comprises a grid of at least one horizontal line and at least one vertical line. The instructions also include code for causing the electronic device to obtain at least one gesture input. The instructions also include code for causing the electronic device to determine at least one caricature action based on the at least one gesture input. The instructions further include code for causing the electronic device to generate a caricature image based on the image mesh, the at least one caricature action and the image.

An apparatus for interactive image caricaturing is described. The apparatus includes means for detecting at least one feature location of an image. The apparatus also includes means for generating, based on the at least one feature location, an image mesh that comprises a grid of at least one horizontal line and at least one vertical line. The apparatus also includes means for obtaining at least one gesture input. The apparatus also includes means for determining at least one caricature action based on the at least one gesture input. The apparatus further includes means for generating a caricature image based on the image mesh, the at least one caricature action and the image.

Some configurations of the systems and methods disclosed herein provide interactive image (e.g., face) caricaturing. Face caricaturing may denote one or more procedures of generating a face image with exaggerated facial components from a normal face image. Previously, this was manually done by artists, while nowadays computer-based automatic face caricaturing has become available.

One method of computer-based face caricaturing may contain the following steps. First, detect facial feature locations in the input image. These features may include eye corners, nostrils, mouth corners, chin and other facial contour points. Second, for each feature location, compute the new location for the caricatured face by scaling up or down the distance between this feature location in the input image and the corresponding one in an average face. Third, apply a texture warping technique to warp the texture of the face in the input image to the caricatured face. The texture warping may be based on a transform that maps each facial feature location in the input image to the corresponding facial feature location in the caricatured face.

Figure 3:
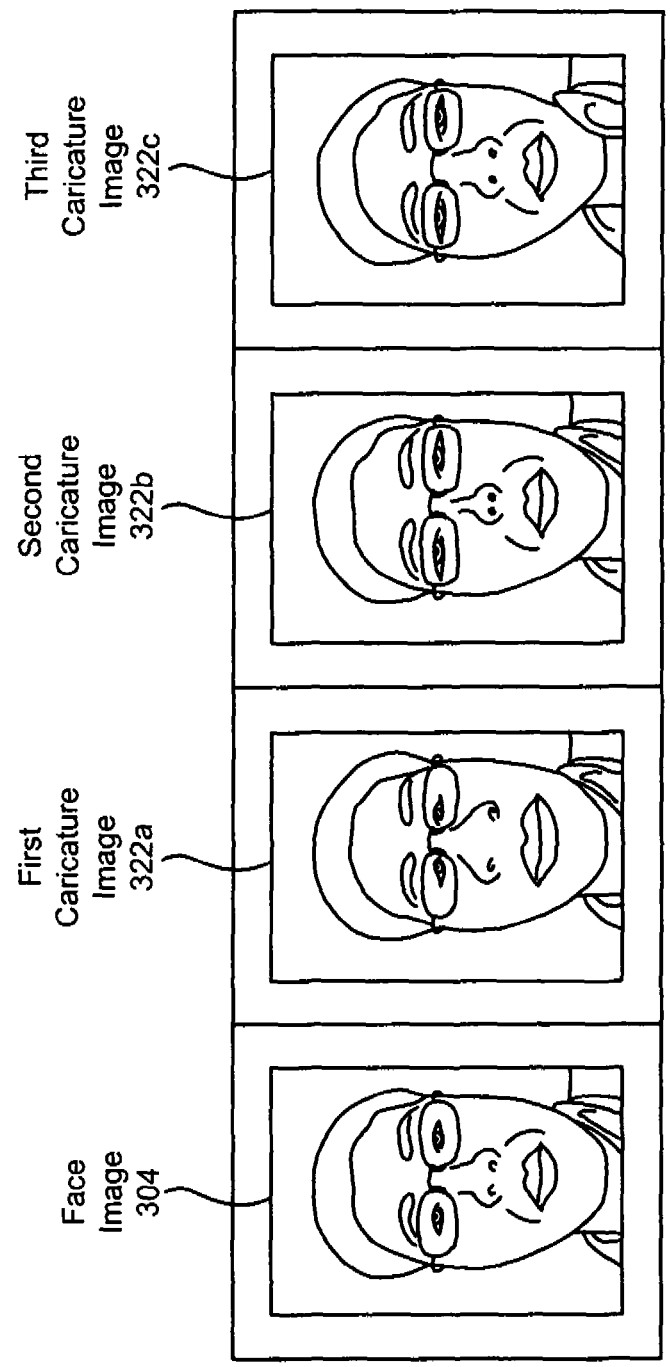
FIG. 3 illustrates a face image and examples of caricature images that may be generated using the systems and methods disclosed herein.

However, user interaction may be added to computer face caricaturing to achieve a user-desired style of caricaturing (e.g., a particular style with enlarged eyes and a shrunken nose). The systems and methods disclosed herein achieve interactive face caricaturing and may be applied to mobile devices with a touch screen. Different finger gestures on the touch screen may be interpreted as different caricaturing actions on a mesh-based face caricaturing model, so that the user can easily generate interesting caricaturing by using simple finger movements on the touch screen. FIG. 3 provides examples of caricaturing based on the systems and methods disclosed herein. In particular, FIG. 3 illustrates an original face image on the left and three caricaturing effects in the remaining images.

In one application scenario of interactive face caricaturing in accordance with the systems and methods disclosed herein, a face image may be displayed on a touch screen and the user may use his/her fingers on the touch screen to add desired caricaturing action(s) to the face image. After each action, the displayed caricatured face image may be the result of previous caricaturing actions applied sequentially to the original face image.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 for interactive image caricaturing. As used herein, the term "caricaturing" may refer to a manipulation of an image 104. Image caricaturing may manipulate one or more pixels of the image. For example, image caricaturing may include changing a pixel's general location. For instance, image caricaturing may include changing a pixel's location relative to other pixels in the image 104. Caricaturing may also include interpolating new pixels.

Examples of the electronic device 102 include smart phones, cellular phones, digital cameras, desktop computers, laptop computers, tablets, personal digital assistants (PDAs), mobile devices, etc. The electronic device 102 may include one or more of a feature location detection block/module 106, an image mesh generation block/module 110, a caricature action determination block/module 116 and a caricature image generation block/module 120. As used herein, the term "block/module" may be used to indicate that a particular element may be implemented in hardware (e.g., circuitry), software or a combination of both. For example, the caricature action determination block/module 116 may be implemented in hardware (e.g., circuitry), software or a combination of both.

The electronic device 102 may obtain an image 104. In some implementations, the image 104 may be a face image 104. Additionally or alternatively, the image 104 may be a previously generated caricature image 122. The electronic device 102 may include (or be coupled to) an image sensing device (not pictured) that captures the image 104. The image sensing device may include an image sensor. Examples of the image sensing device may include a camera and a scanner. For example, a smartphone (e.g., the electronic device 102) may include a camera (e.g., the image sensing device) that captures a face image 104.

In another example, the electronic device 102 may receive the image 104 from another device. For instance, the electronic device 102 may receive the image 104 from another device over a network (e.g., a local area network (LAN), the internet, a cellular network, etc.) or through a direct link (e.g., a Universal Serial Bus (USB) cable, a Bluetooth wireless link, etc.).

The image 104 (e.g., the face image) may be provided to the feature location detection block/module 106 and the caricature image generation block/module 120. Via the feature location detection block/module 106, the electronic device 102 may detect at least one feature location 108 of the image 104. A feature location 108 may refer to the location of a distinct feature of the image 104. For example, a face image 104 may include features such as the contours of the face, the corners of eyes, the tip of a nose, the corners of a nose, the nostrils, the corners of a mouth, the forehead, the chin, the ears, the cheeks, etc. The feature location 108 may refer to the location of the pixels that make up the feature. As used herein, the location of the pixels may refer to the coordinates (in an x, y coordinate system, for example) of the pixels that make up the image. The feature location determination block/module 106 may determine the feature location 108 based on one or more algorithms. For example, the feature location determination block/module 106 may analyze one or more pixels (e.g., pixel coloration) to determine where a feature of the image 104 is located.

The feature locations 108 (e.g., facial feature locations) may be provided to the image mesh generation block/module 110. The image mesh generation block/module 110 may generate an image mesh 112. The image mesh 112 may include a grid of at least one horizontal line and at least one vertical line. The lines may intersect at one or more vertices. In other words, the image mesh 112 may include a grid of vertices that each indicate an intersection of a horizontal line and a vertical line.

In some implementations, the image mesh 112 may be based on at least one feature location 108. For example, some of the vertices of the image mesh 112 may correspond to different feature locations 108. For instance, for a face image 104, the image mesh 112 may include multiple vertices that correspond to multiple facial feature locations 108 (e.g., the corners of the eyes, the corners of the nose, the corners of the mouth, etc.). In other words, the vertices may correspond to the pixels of the image 104 that make up the facial features. Further, in this example, one or more of the features may correspond to the same line of the image mesh 112. For example, as will be described below in connection with at least FIG. 4, the corners of the eyes may correspond to the same horizontal line of the image mesh 112. It should be noted that in some implementations, not all of the vertices may align with feature locations.

As will be described below, as the vertices are moved based on the gesture input 114, the corresponding features (e.g., the pixels that make up the features) may be moved in a similar fashion. For example, if a horizontal line of the image mesh 112 is moved upward, the features (e.g., the corners of the eyes) that correspond to vertices on this horizontal line may also move upward.

The electronic device 102 may obtain a gesture input 114. As used herein, a gesture input 114 may refer to a motion that is received as input by the electronic device 102. For example, an object (e.g., a finger or a stylus) may move in a vertical direction from a starting point. This may be received by the electronic device 102 as a gesture input 114. In some implementations, the gesture input 114 may be a touch input. For example, a smartphone (e.g., the electronic device 102) may include (or be coupled to) a touch screen. In this example, a user may touch an object (e.g., a finger or a stylus) to the touch screen at a starting point and may move the object in a vertical direction while maintaining contact with the touch screen. In a similar fashion, the touch screen may detect a horizontal gesture input 114.

In some implementations, the gesture input 114 may not be a touch input. For example, the electronic device 102 may include a motion sensing device (a camera, for example) that detects motion. In this example, the motion sensing device may detect the movement of an object (e.g., the finger or the stylus) that is not in contact with the electronic device 102. For example, an object not in contact with the electronic device 102 may move in a vertical direction. The electronic device 102, via the camera (e.g., the motion sensing device), may detect the gesture input 114.

In some implementations, the gesture input 114 may include multiple gesture inputs 114. For instance, the electronic device 102 (via a touch screen, for example) may detect two gesture inputs 114 (via two fingers of a user). For example, the electronic device 102 may detect a vertical pinch close gesture input 114. A vertical pinch close gesture input 114 may include two vertical gesture inputs 114 moving towards each other. By comparison, the electronic device 102 may detect a vertical pinch open gesture input 114 which may include two vertical gesture inputs 114 moving away from each other. Similarly, the electronic device 102 may detect a horizontal pinch open gesture input 114 (e.g., two horizontal gesture inputs 114 moving away from each other) or a horizontal pinch close gesture input 114 (e.g., two horizontal gesture inputs 114 moving towards each other).

The gesture input(s) 114 may be provided to a caricature action determination block/module 116 that may determine a caricature action 118. The caricature action 118 may include information on how the image 104 may be manipulated to generate a caricature image 122. For example, the caricature action 118 may include information indicating how the vertices of the image mesh 112 may be moved to generate a caricature image 122. In some implementations, the information may include a mapping showing how a vertex of an image mesh 112 moves between the image 104 and the caricature image 122.

In some implementations, the caricature action 118 may be based on the gesture input(s) 114. For example, if the electronic device 102 obtains a vertical pinch open gesture input 114, the caricature action 118 may include information indicating one or more vertices may be moved farther apart from one another. More detail regarding the movement of vertices based on the gesture input(s) 114 is given in connection with at least one of FIGS. 8-11. As will be described in connection with at least one of FIGS. 8-11, which vertices move, and how much the vertices move may be based on the location of the vertices and the distance of the vertices from the starting point of the gesture input 114.

The caricature action 118 may provide a mapping between a vertex prior to the gesture input(s) 114 (e.g., of the original image 104) and the same vertex after the gesture input(s) 114 (e.g., of the caricature image 122). For example, the caricature action 118 may provide a mapping between the location of a first vertex in the original image 104, and the location of the same first vertex in the caricature image 122. It should be noted that the location (e.g., the x, y coordinates) of the first vertex may change between the image 104 and the caricature image 122.

In some implementations, the caricature action 118 may provide an interpolation of the non-vertex pixels of an image 104 (e.g., the pixels that do not correspond to a vertex of the image mesh 112). For example, based on the mapping of the image mesh 112 vertices, the electronic device 102 may interpolate the movement of the other pixels in the image 104. Based on this interpolation, the electronic device 102 may apply a texture warping to pixels in the image, based on the mapping.

The image mesh 112, the caricature action 118 and the image 104 may be provided to the caricature image generation block/module 120. The caricature image generation block/module 120 may generate a caricature image 122 based on the image mesh 112, the caricature action 118 and the image 104. A caricature image 122 may refer to a version of the image 104 that has been manipulated. For example, one or more of the pixels of the image 104 may be positioned differently to generate a caricature image 122. The caricature image generation block/module 120 may generate the caricature image 122 by applying the caricature action 118 to the image mesh 112 and the image 104. For example, as will be described in more detail in FIGS. 8-11, if the caricature action 118 contains information indicating a first vertex is to be moved away from a second vertex, the caricature image generation block/module 120 may move the first vertex of the image mesh 112 and a feature of the image 104 corresponding to the first vertex away from a feature of the image 104 corresponding to the second vertex of the image mesh 112. Similarly, the caricature image generation block/module 120 may manipulate the non-vertex pixels of the image 104 according to a non-vertex pixel mapping indicated in the caricature action 118. As described above, the non-vertex pixel mapping may be generated by an interpolation of the mapping of the vertices of the image mesh 112 and a texture warping may be applied to the pixels.

Figure 2:
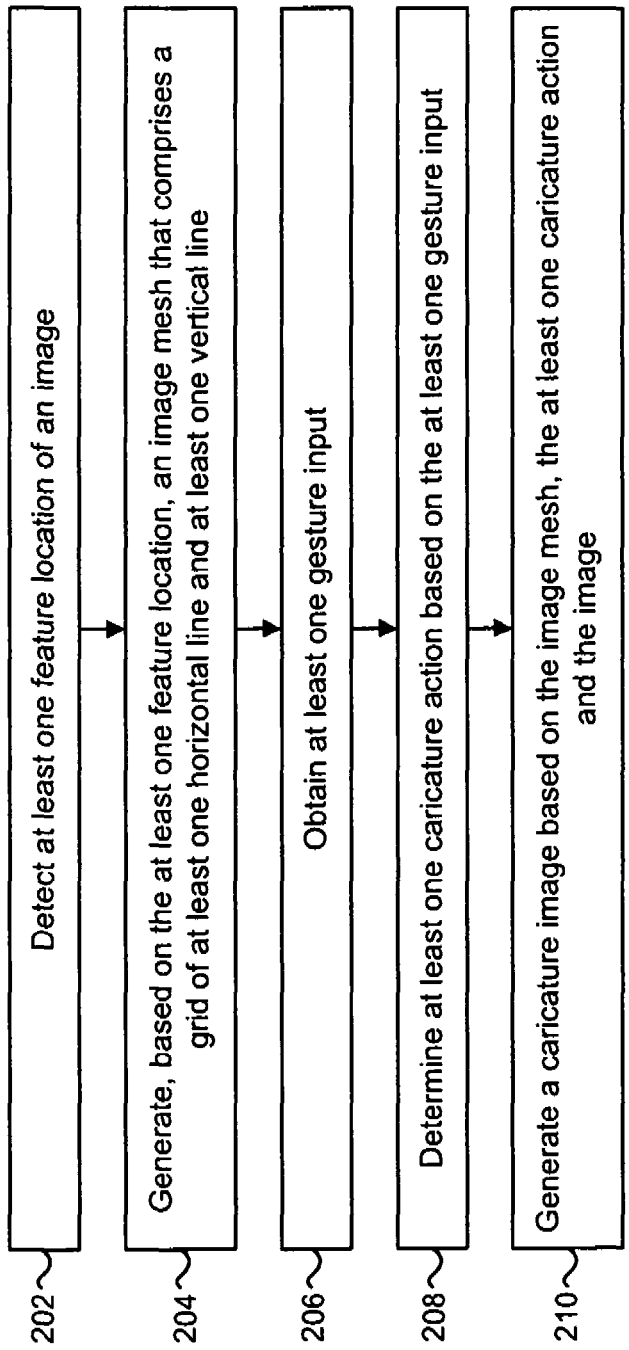
FIG. 2 is a flow diagram illustrating one configuration of a method for interactive image caricaturing by an electronic device.

FIG. 2 is a flow diagram illustrating one configuration of a method 200 for interactive image caricaturing by an electronic device 102. The electronic device 102 may detect 202 at least one feature location 108 of an image 104. For example, the electronic device 102 may detect 202 at least one facial feature location 108 of a face image 104. Examples of facial features include the corners of eyes, the tip of a nose, the corners of a nose, the corners of a mouth, a forehead, a chin, ears, cheeks, etc. The electronic device 102 may utilize one or more approaches to determine feature locations 108 in the image 104. For example, the electronic device 102 may determine pixel locations of face contours or edges (e.g., top, sides, bottom or chin, etc.), eyes, nose (e.g., nostrils), mouth, forehead, etc. of a face image 104.

In some implementations, the image 104 may be one that was detected by an image sensing device (e.g., a camera or a scanner) that is coupled to the electronic device 102. In other implementations, the image 104 may be one that was received by another device (e.g., an Internet server, another electronic device, etc.)

In some implementations, the image 104 may be a caricature image that has previously been generated. For example, in a prior cycle of the method 200, a caricature image may have been generated based on previous (or existing) caricature actions and a previous image. In this example, the method 200 may include performing image caricaturing on the previously generated caricature image.

The electronic device 102 may generate 204 an image mesh 112 that includes a grid of at least one horizontal line and at least one vertical line. In some implementations, each line may correspond to an index. For example, a first horizontal line may have a first horizontal index (H0, for example) and a second horizontal line may have a second horizontal index (H1, for example). Similarly, a first vertical line may have a first vertical index (V0, for example) and a second vertical line may have a second vertical index (V1, for example). The intersection of a horizontal line and a vertical line may result in a vertex of the image mesh 112. Each vertex of the image mesh 112 may be specified by its horizontal line index (e.g., H0, H1, . . . , H6) and its vertical line index (e.g., V0, V1, . . . , V7) in a coordinate form. For example, a first vertex at the intersection of the first horizontal line (e.g., H0) and the first vertical line (e.g., V0) may be specified by the coordinates (H0, V0). It should be noted that the actual location of each vertex on the image mesh 112, as indicated by vertex coordinates in the image coordinate system X-O-Y (e.g., an x, y coordinate system), may change after a caricature action 118.

In some implementations, the electronic device 102 may generate 204 an image mesh 112 based on at least one feature location 108. For instance, the electronic device 102 may generate 204 an image mesh 112 in which at least one vertex (e.g., the intersection of a horizontal line and a vertical line) corresponds to a feature location 108. For example, the electronic device 102 may generate 204 an image mesh 112 in which vertices may correspond to one or more of the corners of the eyes, the corners of the mouth, the corners of the nose, etc. It should be noted that in some cases one or more features (and corresponding vertices) may fall on the same horizontal line. For example, corners of the eyes may correspond to vertices of the image mesh 112 that correspond to the same horizontal line.

The electronic device 102 may obtain 206 at least one gesture input 114. As described above, in some implementations, the gesture input(s) 114 may be a touch input. In these implementations, the electronic device 102 may include (or be coupled to) a touch screen that detects a touch input. In other implementations, the electronic device may obtain 206 the gesture input(s) 114 via a motion sensing device that is coupled to the electronic device 102. In this example, the electronic device 102 may obtain 206 the gesture input(s) 114 without physical contact with the electronic device 102. In some implementations, obtaining 206 at least one gesture input 114 may include determining a direction of the gesture input(s) 114. For example, a touch screen may detect a vertical gesture input 114. Similarly, the touch screen may detect a horizontal gesture input 114.

In some implementations, the electronic device 102 may obtain 206 multiple gesture inputs 114. For example, a touch screen coupled to the electronic device 102 may receive touch inputs from multiple objects (e.g., two fingers) simultaneously. In this example, the touch screen may also detect the relative motion of the gesture inputs 114. For example, the touch screen may detect whether the gesture inputs 114 are moving closer together or farther apart.

The touch screen may detect whether the gesture inputs 114 are aligned. For example, the touch screen may detect whether the starting points of the gesture inputs 114 are horizontally aligned or vertically aligned. In some implementations, being aligned may indicate that the starting points of the gesture inputs 114 substantially fall on the same line (e.g., the same horizontal line for horizontally aligned gesture inputs 114 and the same vertical line for vertically aligned gesture inputs 114). In other implementations, determining whether gesture inputs 114 are aligned may include determining if the gesture inputs 114 are within a threshold angle of one another. In yet other implementations, being aligned may mean that the starting points of the gesture inputs 114 are less than a threshold distance away from a line of the image mesh 112.

The electronic device 102 may determine 208 at least one caricature action 118 based on the at least one gesture input 114. The caricature action 118 may provide shifting information for at least one vertex of the image mesh 112. The shifting information may indicate how the feature locations 108 of an image 104 (and the image mesh 112 vertices) may be manipulated to generate a caricature image 122. For example, if the electronic device 102 obtains 206 two gesture inputs 114 that are moving farther away from each other in a vertical direction (e.g., a vertical pinch open gesture input 114), the caricature action 118 may include information indicating that one or more vertices may also be moved farther away from one another. It should be noted that in some implementations, the distance the vertices move may be equal to or different than the movement of the gesture inputs 114. More detail regarding the movement of vertices based on the gesture input 114 is given in connection with FIGS. 8-11 below. In this example, the caricature action 118 may provide a vertex pixel map that maps an image vertex pixel to its corresponding caricature image vertex pixel based on the shifting information. The pixel map may indicate how a particular pixel may move based on the gesture input 114.

The electronic device 102 may generate 210 a caricature image 122 based on the image mesh 112, the at least one caricature action 118 and the image 104 (or a previously generated caricature image). In some implementations, generating 210 a caricature image 122 may include applying the at least one caricature action 118 to the image 104 (or previously generated caricature image). For example, as described above, the at least one caricature action 118 may include a mapping of at least one vertex in the image 104 (or previously generated caricature image) before the gesture input 114 to a corresponding vertex in the caricature image 122 after the gesture input 114. In this example, the electronic device 102 may apply the mapping and move the corresponding feature locations 108 of the image 104 (or previously generated caricature image) and/or the vertices of the mesh image 112.

Generating 210 a caricature image 112 may also include manipulating one or more pixels that are not associated with a vertex of the image mesh 112. For example, the caricature action 118 may include an interpolation of the location of other pixels (e.g., pixels that do not correspond to a vertex) in the caricature image 122. In this example, the electronic device 102 may interpolate the location of other pixels based on the pixel map and perform a texture warping on the pixels.

FIG. 3 illustrates a face image 304 and examples of caricature images 322a-c that may be generated using the systems and methods disclosed herein. As described above, the electronic device 102 may receive the face image 304 via an image sensing device (e.g., camera or scanner) that is coupled to the electronic device 102. In some implementations multiple caricature images 322a-c may be generated. For example, a first caricature image 322a may be generated based on a first set of caricature actions 118 and the face image 304. In this example, a first set of gesture inputs 114 may indicate the first set of caricature actions 118 as described herein. In this example, the electronic device 102 may maintain a caricature action list that includes the caricature actions that have been applied to the face image 304. For example, the caricature action list may include the first set of caricature actions 118.

In some examples, a second caricature image 322b may be generated based on a second set of caricature actions 118 and the first caricature image 322a. In this example, a second set of gesture inputs 114 may indicate the second set of caricature actions 118. The second set of caricature actions 118 may be appended to the caricature action list (e.g., that includes the first set of caricature actions 118).

In some examples, a third caricature image 322c may be generated based on a third set of caricature actions 118 and the second caricature image 322b. In this example, a third set of gesture inputs 114 may indicate the third set of caricature actions 118. The third set of caricature actions 118 may be appended to the caricature action list (e.g., that includes the first set of caricature actions 118 and the second set of caricature actions 118). It should be noted that each caricature image 322a-b may be a result of the previous caricature actions 118. For example, the third caricature image 322c may be a result of the first, second and third set of caricature actions 118 being applied to the face image 304.

Figure 4:
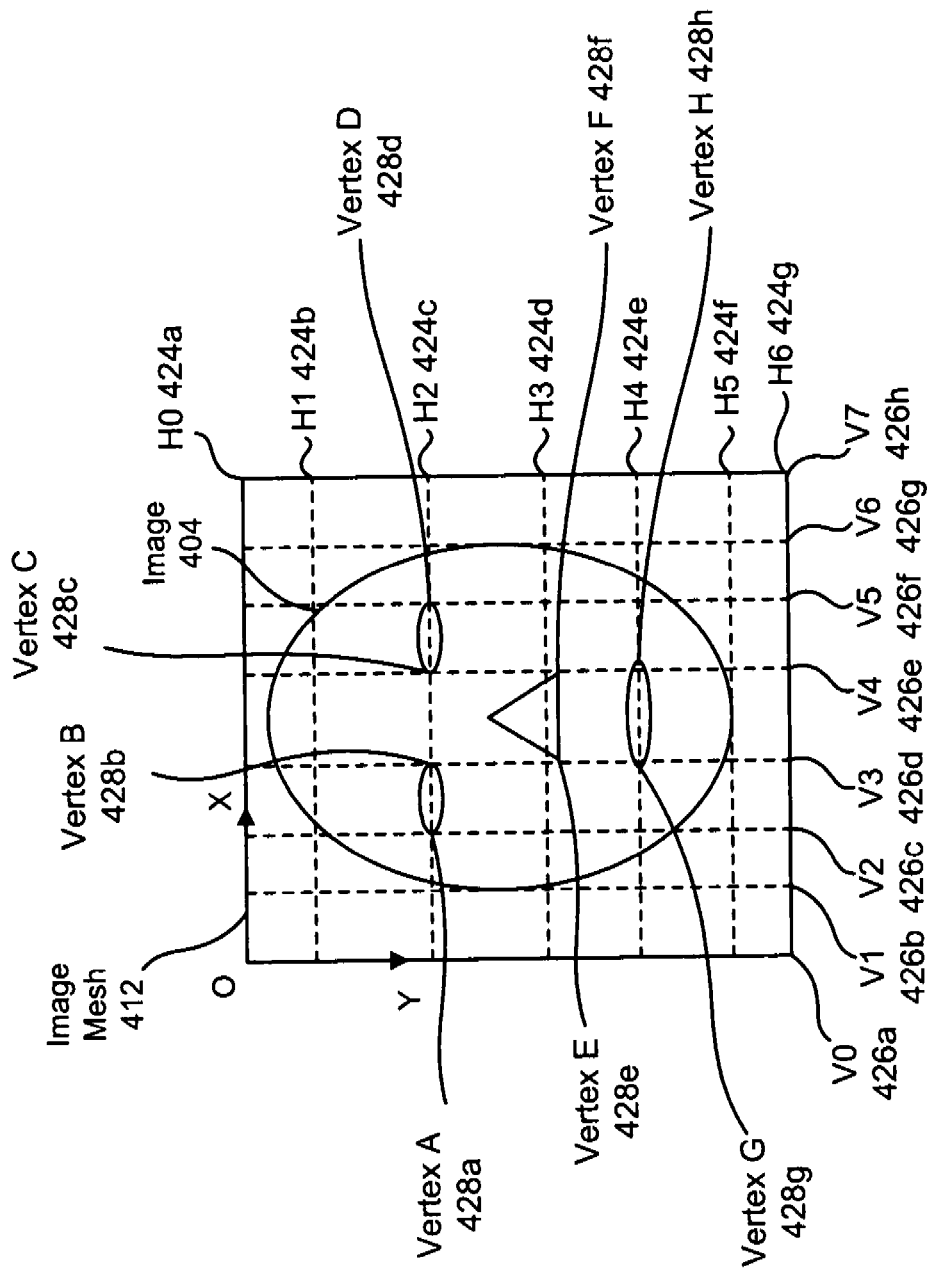
FIG. 4 illustrates an example of a mesh-based model that may be generated using the systems and methods disclosed herein.

FIG. 4 illustrates an example of a mesh-based model in which systems and methods for interactive image caricaturing may be implemented. In some implementations, the mesh-based model may include an image mesh 412 superimposed on an image 404. The image mesh 412 and the image 404 may be examples of corresponding elements described in connection with FIG. 1. As described above, the image mesh 412 may include vertices 428 that correspond to feature locations 108. For example, vertices A, B, C and D 428a-d may correspond to eye corner feature locations 108. Vertices E and F 428e-f may correspond to nose corner feature locations 108. Vertices G and H 428g-h may correspond to mouth corner feature locations 108.

As described above, the image mesh 412 may include at least one horizontal line 424 and at least one vertical line 426. Each horizontal line 424 and vertical line 426 may be identified by a line index. For example, the first horizontal line 424a may have a horizontal line index of H0. Similarly, the other horizontal lines 424b-g may have corresponding horizontal line indices H1-H6. Each horizontal line 424 may also include one or more feature locations 108. For example, from top to bottom, the first horizontal line (e.g., H0) 424a may be the top image border, the second horizontal line (e.g., H1) 424b may be defined by the forehead, the third horizontal line (e.g., H2) 424c may run across two eyes, the fourth horizontal line (e.g., H3) 424d may run across the nostrils, the fifth horizontal line (e.g., H4) 424e may be defined by the mouth, the sixth horizontal line (e.g., H5) 424f may be defined by the chin, and the last horizontal line (e.g., H6) 424g may be the bottom image border.

In a similar fashion, each vertical line 426a-h may have a vertical line index V0-V7 and may also include one or more feature locations. For example, from left to right, the first vertical line (e.g., V0) 426a may be the left image border, the second vertical line (e.g., V1) 426b may be defined by the leftmost face contour point, the third vertical line (e.g., V2) 426c may be defined by the outer left eye corner, the fourth vertical line (e.g., V3) 426d may be defined by the inner left eye corner, the fifth vertical line (e.g., V4) 426e may be defined by the inner right eye corner, the sixth vertical line (e.g., V5) 426f may be defined by the outer right eye corner, the seventh vertical line (e.g., V6) 426g may be defined by the rightmost face contour point and the last vertical line (e.g., V7) 426h may be defined by the right image border.

Each vertex on the image mesh 412 may be specified by its horizontal line index (e.g., H0, H1, . . . , H6) and its vertical line index (e.g., V0, V1, . . . , V7). For example, vertex A 428a (e.g., corresponding to the outer left eye corner feature location 108) may be Vert (H2, V2). It should be noted that the location of each vertex on the image 404, as indicated by vertex coordinates in the image coordinate system X-O-Y (e.g., an x, y coordinate system), may change after a caricature action 118.

Figure 5:
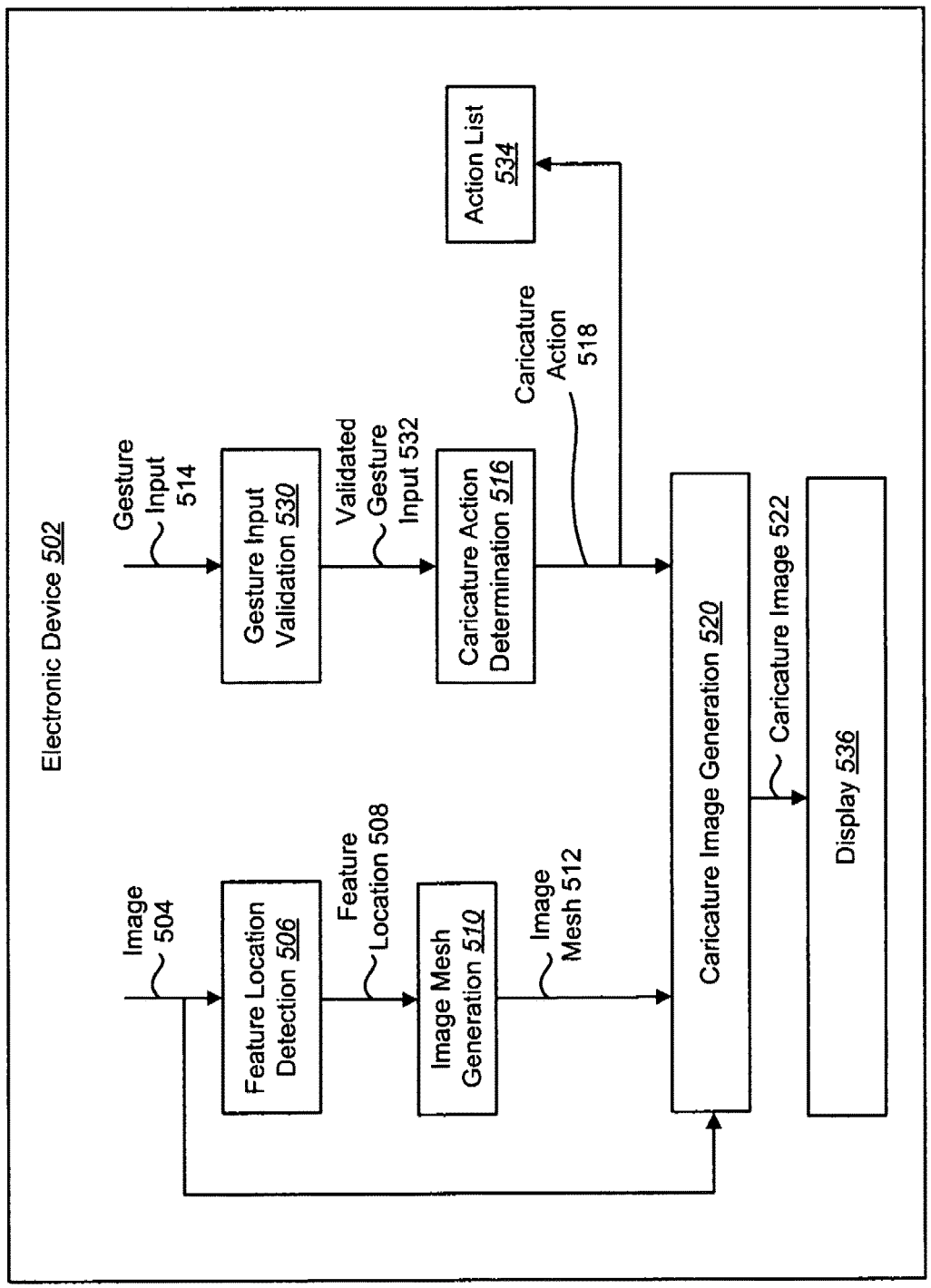
FIG. 5 is a block diagram illustrating a more specific configuration of an electronic device in which systems and methods for interactive image caricaturing may be implemented.

FIG. 5 is a block diagram illustrating a more specific configuration of an electronic device 502 in which systems and methods for interactive image caricaturing may be implemented. The electronic device 502 may be an example of the electronic device 102 described in connection with FIG. 1. The electronic device 502 may include one or more of a feature location detection block/module 506, an image mesh generation block/module 510, a caricature action determination block/module 516 and a caricature image generation block/module 520 that may be examples of corresponding elements described in connection with FIG.

1. In some implementations, the electronic device 502 may pass an image 504, one or more feature locations 508, an image mesh 512, a gesture input 514, a caricature action 518 and a caricature image 522 that may be examples of corresponding elements described in connection with FIG. 1.

In some implementations, the electronic device 502 may include (or be coupled to) a display 536 that displays at least one of the image 504, the caricature image 522 and the image mesh 512. In another example, the electronic device 502 may be coupled to a projector and may project the image 504, the image mesh 512 and/or the caricature image 522. In some implementations, the display 536 may present the image mesh 512 that may be displayed in addition to a face image 504 as a mesh-based model as depicted in FIG. 4. As will be described in connection with FIG. 13, the image mesh 512 may also be displayed in addition to the caricature image 522 as a distorted image mesh.

The electronic device 502 may also include a gesture input validation block/module 530 that determines whether the gesture input(s) 514 are valid. For example, finger gestures on a touch screen may be detected and checked to determine whether they are valid gesture inputs 514. A valid gesture input 514 may be a gesture input 514 that is recognized by the electronic device 502. For example a valid gesture input 514 may be one from which a caricature action 518 may be determined. Examples of valid gesture inputs 514 include, but are not limited to pinch open and pinch close gesture inputs in horizontal or vertical directions.

In some implementations the gesture input validation block/module 530 may determine that a gesture input 514 is valid when the motion of the gesture inputs 514 relative to one another is greater than a motion threshold. For example, when two fingers move horizontally or vertically closer to or away from each other for a distance greater than a motion threshold (30 pixels, for example), the electronic device 502 may determine that a gesture input 514 is valid.

Validating the gesture input 514 may also include determining whether the gesture inputs 514 are aligned. Horizontal gesture inputs 514 may be horizontally aligned if the starting points of the gesture inputs 514 substantially fall on the same horizontal line of the image mesh 512. Similarly, vertical gesture inputs 514 may be vertically aligned if the starting points of the gesture inputs 514 substantially fall on the same vertical line of the image mesh 512. In some implementations, the electronic device 502 may determine that gesture inputs 514 that are not aligned are not valid gesture inputs 514. By comparison, the electronic device 502 may determine that gesture inputs 514 that are aligned are valid gesture inputs 514. Once a gesture input 514 has been validated, a validated gesture input 532 may be provided to the caricature action determination block/module 516, which may determine a caricature action 518 as described in connection with FIG. 2.

In some implementations, the electronic device 502 may maintain a caricature action list 534 that contains a list of all the caricature actions 518 that have been determined. In some implementations, the caricature action list 534 may include caricature actions 518 that have previously been applied to the image 504, for example in previous instances of the method 200. In this example, the caricature action 518 currently being applied may be appended to the caricature action list 534. For example, as a caricature action 518 is identified by the gesture input 514, the electronic device 502 may store the caricature action 518 to the caricature action list 534 (e.g., which may or may not include previous caricature actions 518 that have been applied to the image 504).

Figure 6:
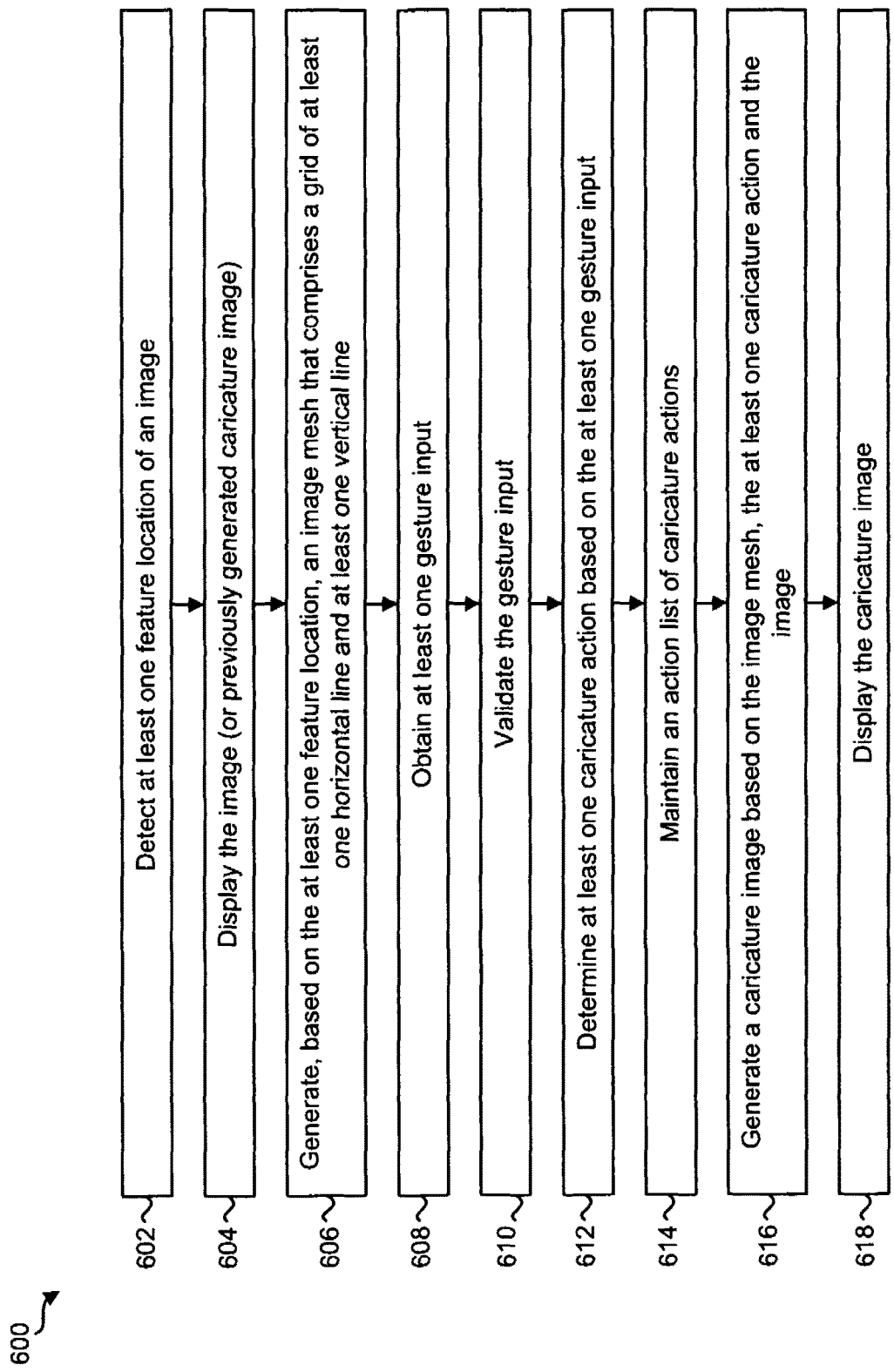
FIG. 6 is a flow diagram illustrating a more specific configuration of a method for interactive image caricaturing by an electronic device.

FIG. 6 is a flow diagram illustrating a more specific configuration of a method 600 for interactive image caricaturing by an electronic device 502. The electronic device 502 may detect 602 at least one feature location 508 of the image 504. In some implementations this may be done as described in connection with FIG. 2.

In some implementations, the electronic device 502 may display 604 the image 504. For example, the electronic device 502 may be coupled to a display 536 that presents the image 504. Examples of the display 536 may include a display screen of the electronic device 502, a television, a projector, etc. As described above, the image 504 may be a previously generated caricature image (e.g., generated based on previous, or existing, caricature actions). In this example the electronic device 502 may display 604 the previously generated caricature image.

The electronic device 502 may generate 606, based on the at least one feature location 508, an image mesh 512 that comprises a grid of at least one horizontal line 424 and at least one vertical line 426. In some implementations this may be done as described in connection with FIG. 2. In some implementations, the electronic device 502 may also display the image mesh 512. For example, the display 536 may superimpose the horizontal lines 424 and the vertical lines 426 of the image mesh 512 on top of the image 504 (or previously generated caricature image) as depicted in FIG. 4.

The electronic device 502 may obtain 608 at least one gesture input 514. In some implementations this may be done as described in connection with FIG. 2.

The electronic device 502 may validate 610 the gesture input(s) 514. Validating 610 the gesture input(s) 514 may include determining whether the gesture input(s) 514 are recognized by the electronic device 502. Validating 610 the gesture input(s) 514 may include determining whether the gesture input(s) 514 may determine a caricature action 518. For example, the electronic device 502 may determine whether the gesture input 514 is one of a vertical pinch close gesture input, vertical pinch open gesture input, horizontal pinch close gesture input or horizontal pinch open gesture input.

In some implementations validating 610 the gesture input(s) 514 may include determining whether the motion of gesture inputs 514 relative to one another is greater than a motion threshold. For example, when two fingers move horizontally or vertically closer to or away from each other by an amount greater than a certain number of pixels (e.g., 30 pixels, for example), the gesture input 514 may be determined to be valid. By comparison, if the fingers have not moved closer to or away from each other by an amount greater than the certain number of pixels, the electronic device 502 may determine 610 that the gesture input 514 is not valid.

Validating 610 the gesture input 514 may also include determining whether the gesture inputs 514 are aligned. For example, gesture inputs 514 that are aligned may be determined to be valid. By comparison, gesture inputs 514 that are not aligned may be determined to be invalid. Gesture inputs 514 may be aligned vertically or horizontally. Gesture inputs 514 may be aligned if the starting points of the gesture inputs 514 substantially fall on the same line (e.g., the same horizontal line for horizontally aligned gesture inputs 514 and the same vertical line for vertically aligned gesture inputs 514) of the image mesh 512. In another implementation, vertically aligned gesture inputs 514 may be within a certain angle threshold from one another. In another embodiment, aligned gesture inputs 514 may be within a certain angle threshold from one another.

The electronic device 502 may determine 612 at least one caricature action 518 based on the at least one gesture input 514. In some implementations this may be done as described in connection with FIG. 2.

The electronic device 502 may maintain 614 a caricature action list 534. In some implementations, the caricature action list 534 may contain a list of all the caricature actions 518 that have previously been applied to the image 504 (or previously generated caricature image). In some implementations, maintaining 614 a caricature action list 534 may include appending a currently used caricature action 518 to the caricature action list 534. For example, based on a first set of gesture inputs 514, a first caricature action 518 may be determined. In this example, the electronic device 502 may store the caricature action 518 to the caricature action list 534. Similarly, if a second set of gesture inputs 514 prompts a second caricature action 518, the electronic device 502 may append the second caricature action 518 to the caricature action list 534, which at this point may include the first caricature action 518 (and any previously applied caricature actions 518).

The electronic device 502 may generate 616 a caricature image 522 based on the image mesh 512, the at least one caricature action 518 and the image 504 (or the previously generated caricature image). In some implementations this may be done as described in connection with FIG. 2. As will be described below, in some configurations, multiple caricature actions 518 (e.g., the first set and second set) may be applied to the image 504 (or previously generated caricature image) simultaneously. For example, the new locations of all vertices (e.g., in the caricature image 522) due to all the caricature actions 518 may be computed and then a single texture warping may be applied once to the image 504 (or previously generated caricature image) to generate the caricature image 522.

In some implementations, the electronic device 502 may display 618 the caricature image 522. For example, the electronic device 502 may include (or be coupled to) a display 536 that presents the caricature image 522. Examples of the display 536 include a display screen of the electronic device 502, a television, a projector, etc. In some implementations, the electronic device 502 may also display the image mesh 512. For example, the display 536 may superimpose a distorted image mesh (e.g., based on the caricature actions 518) on the caricature image 522 as will be described in connection with FIG. 13. It should be noted that the distorted image mesh as displayed with the caricature image 522 may be different than the image mesh 512 as displayed with the image 504. For example, in the distorted image mesh displayed with the caricature image 522, the spacing between one or more vertices (or one or more lines) may be greater than or smaller than the spacing in the image mesh 512 displayed with the image 504.

Figure 7:
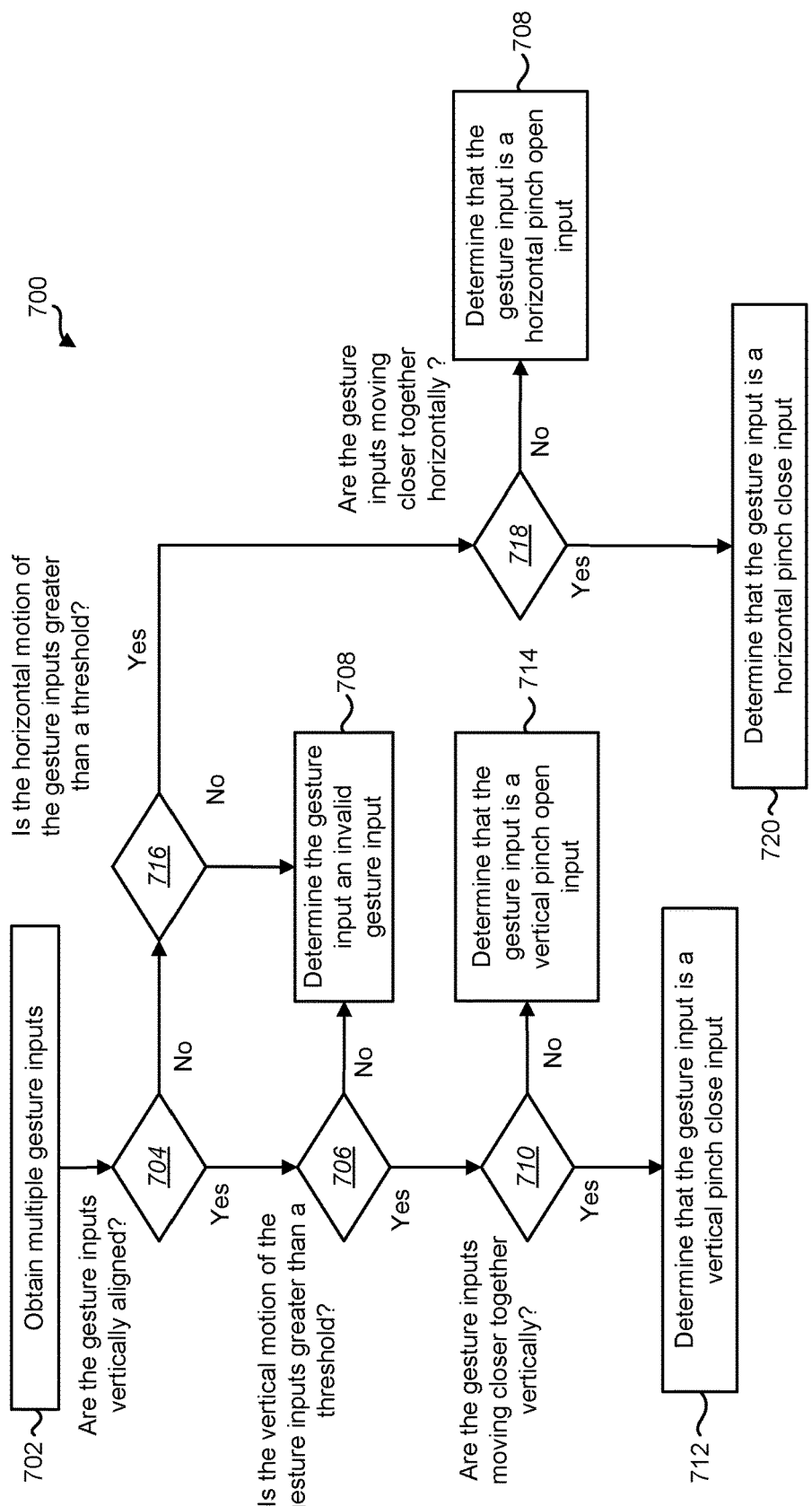
FIG. 7 is a flow diagram illustrating one configuration of a method for validating a gesture input by an electronic device.

FIG. 7 is a flow diagram illustrating one configuration of a method 700 for validating the gesture input(s) 514 by an electronic device 502. The electronic device 502 may obtain 702 multiple gesture inputs 514 (e.g., two fingers moving on a touch screen). In some implementations, this may be done as described in connection with FIG. 2.

The electronic device 502 may determine 704 whether the gesture inputs 514 are vertically aligned. In some implementations, gesture inputs 514 may be vertically aligned if the gesture inputs 514 (the gesture input starting points, for example) substantially fall on the same vertical line 426. By comparison, gesture inputs 514 may not be vertically aligned if the gesture inputs 514 do not substantially fall on the same vertical line 426. In another example, the electronic device 502 may determine 704 that the gesture inputs 514 are vertically aligned if the gesture inputs 514 are within a certain threshold angle of one another. By comparison, the electronic device 502 may determine 704 that the gesture inputs 514 are not vertically aligned if the gesture inputs 514 are not within a certain threshold angle of one another. In yet another implementation, the electronic device 502 may determine 704 that gesture inputs 514 are vertically aligned if the gesture inputs 514 are less than a threshold distance away from the same vertical line. Conversely, the electronic device 502 may determine 704 that gesture inputs 514 are not vertically aligned if they are greater than a threshold distance away from the same vertical line.

If the electronic device 502 determines 704 that the gesture inputs 514 are vertically aligned, the electronic device 502 may determine 706 if the vertical motion of the gesture inputs 514 is greater than a motion threshold. For example, the electronic device 502 may determine 706 if the two gesture inputs 514 (e.g., the two fingers moving on the touch screen) are moving relative to one another (either away from one another or towards one another) by an amount that is at least equal to a determined number of pixels (e.g., thirty). If the electronic device 502 determines 706 that the vertical motion of the gesture inputs 514 is not greater than a motion threshold, the electronic device 502 may determine 708 that the gesture inputs 514 are invalid.

However, if the electronic device 502 determines 706 that the vertical motion of the gesture inputs 514 is greater than the motion threshold, the electronic device 502 may determine 710 whether the gesture inputs 514 are moving closer together vertically. For example, the electronic device 502 may determine 710 that the gesture inputs 514 are moving closer together if the number of pixels between the gesture inputs 514 at the starting points is larger than the number of pixels between the gesture inputs 514 at the end of the motion. In other words, the electronic device 502 may determine 710 that the gesture inputs 514 are moving closer if the number of pixels between the gesture inputs 514 is getting smaller. By comparison, the electronic device 502 may determine 710 that the gesture inputs 514 are moving apart if the number of pixels between the gesture inputs 514 at the starting points is smaller than the number of pixels between the gesture inputs 514 at the end of the motion. In other words, the electronic device 502 may determine 710 that the gesture inputs 514 are moving apart if the number of pixels between the gesture inputs 514 is getting larger.

If the electronic device 502 determines 710 that the gesture inputs 514 are moving closer together vertically, the electronic device 502 may determine 712 that the gesture input 514 is a vertical pinch close gesture input 514. By comparison, if the electronic device 502 determines 710 that the gesture inputs 514 are not moving closer together vertically (e.g., they are moving farther apart vertically), the electronic device 502 may determine 714 that the gesture input 514 is a vertical pinch open gesture input 514.

If the electronic device 502 determines 704 that the gesture inputs 514 are not vertically aligned, the electronic device 502 may determine 716 if the horizontal motion of the gesture inputs 514 is greater than a motion threshold. For example, the electronic device 502 may determine 716 if the two gesture inputs 514 (e.g., the two fingers moving on the touch screen) are moving relative to one another (either away from one another or towards one another) by an amount that is at least equal to a determined number of pixels (e.g., thirty). If the electronic device 502 determines 716 that the horizontal motion of the gesture inputs 514 is not greater than a motion threshold, the electronic device 502 may determine 708 that the gesture input(s) 514 are invalid.

However, if the electronic device 502 determines 716 that the horizontal motion of the gesture inputs 514 is greater than the motion threshold, the electronic device 502 may determine 718 whether the gesture inputs 514 are moving closer together horizontally. For example, the electronic device 502 may determine 718 that the gesture inputs 514 are moving closer together horizontally if the number of pixels between the gesture inputs 514 at the starting points is larger than the number of pixels between the gesture inputs 514 at the end of the motion. In other words, the electronic device 502 may determine 718 that the gesture inputs 514 are moving closer together horizontally if the number of pixels between the gesture inputs 514 is getting smaller. By comparison, the electronic device 502 may determine 718 that the gesture inputs 514 are moving apart if the number of pixels between the gesture inputs 514 at the starting points is smaller than the number of pixels between the gesture inputs 514 at the end of the motion. In other words, the electronic device 502 may determine 718 that the gesture inputs 514 are moving apart if the number of pixels between the gesture inputs 514 is getting larger.

If the electronic device 502 determines 718 that the gesture inputs 514 are moving closer together horizontally, the electronic device 502 may determine 720 that the gesture input 514 is a horizontal pinch close gesture input 514. By comparison, if the electronic device 502 determines 718 that the gesture inputs 514 are not moving closer together horizontally (e.g., they are moving farther apart horizontally), the electronic device 502 may determine 722 that the gesture input 514 is a horizontal pinch open gesture input 514. It should be noted that one or more of the steps in the method 700 may be performed by a touch screen of the electronic device 502. For example, the touch screen may detect vertical alignment, horizontal alignment, and/or whether the motion is greater than a motion threshold.

Figure 8:
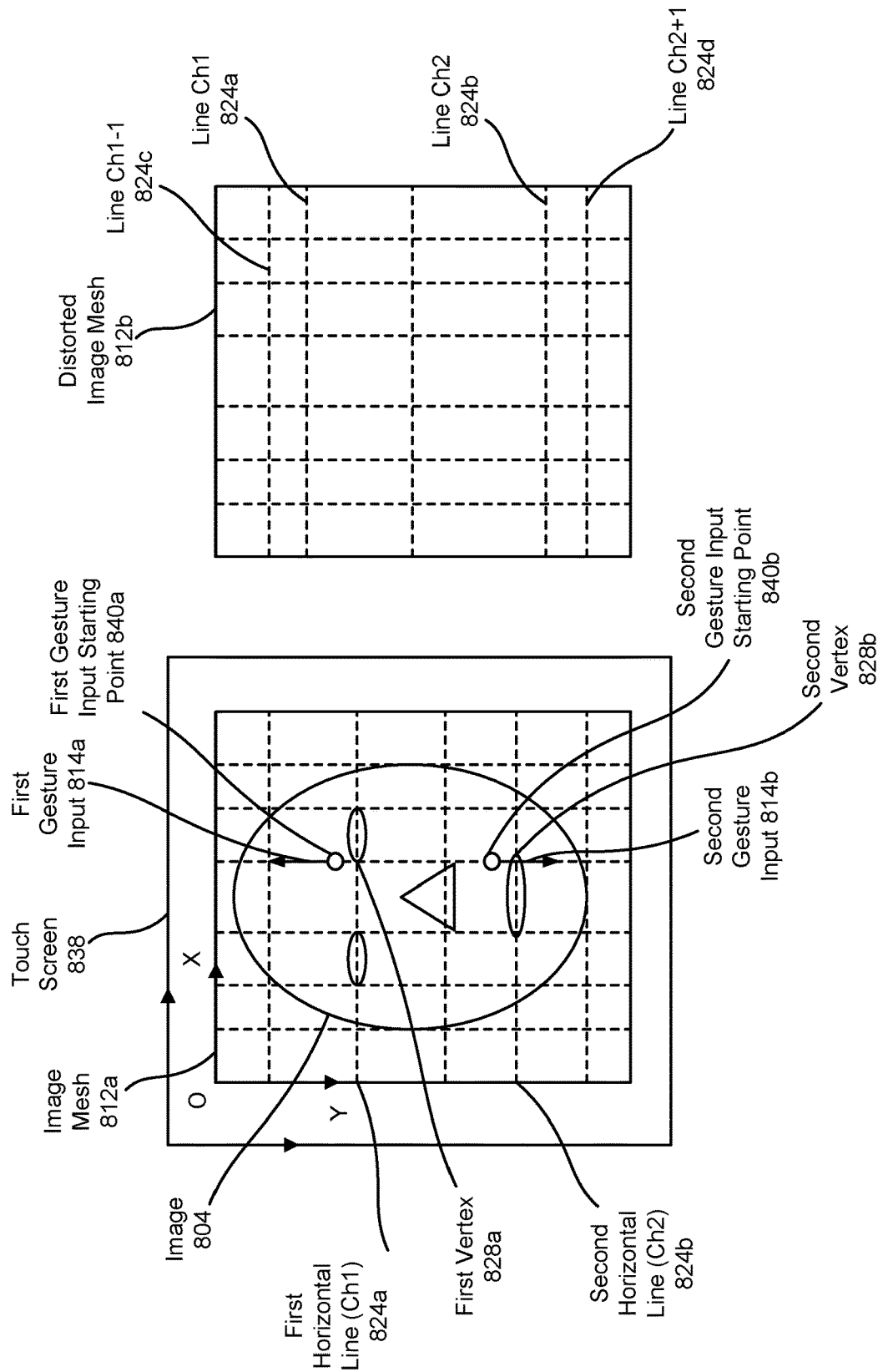
FIG. 8 illustrates an example of a vertical pinch open gesture input.

FIG. 8 illustrates an example of a vertical pinch open gesture input. More specifically, FIG. 8 illustrates a vertical pinch open gesture input (left image) and a distorted image mesh 812b resulting from the corresponding caricature action 118 (right image). As described above, in some implementations, a touch screen 838 may be coupled to the electronic device 102. In this example, a vertical pinch open gesture input may include multiple gesture inputs 814a-b to generate a caricature image 122.

In this example, a first gesture input starting point 840a (e.g., a fingertip starting position on the touch screen 838) may be mapped to a first vertex 828a with coordinates (X1start, Y1start) and a second gesture input starting point 840b may be mapped to a second vertex 828b with coordinates (X2start, Y2start) on the image coordinate system for the interpretation of a caricature action 118. The first vertex 828a and the second vertex 828b may correspond to feature locations 108 of the image 804. For example, the first vertex 828a may correspond to the inner corner of the right eye and the second vertex 828b may correspond to the right corner of the mouth. As described above, a caricature action 118 contains information about which vertices of the image mesh 812a may change locations. It should be noted that, as depicted in FIG. 8, the gesture input starting points 840a-b may not exactly line up with the vertices 828a-b. In this example, the gesture input starting points 840a-b may be mapped to the vertices 828a-b that are closest to the gesture input starting points 840a-b. In another example, the gesture input starting points 840a-b may be mapped to the vertical line that is closest to the gesture input starting points 840a-b.

A vertical caricature action 118 may include four elements, a caricature direction (e.g., Cd), an index (e.g., Ch1) of the first (from top) affected horizontal line 824a in the image mesh 812a, an index (e.g., Ch2) of the last (from top) affected horizontal line 824b (e.g., Ch2) and a predefined vertical caricaturing level with a value between 0 and 1. For simplicity, in FIG. 8, the horizontal lines may be referred to by their indices.

For a vertical caricature action 118, assuming Y1start is greater than Y2start, then line Ch1 824a may be the horizontal line closest to Y1start and line Ch2 824b may be the horizontal line closest to Y2start. In this example, the vertices on line Ch1 824a (which may include the first vertex 828a) and the vertices on line Ch2 824b (which may include the second vertex 828b) and the vertices on the horizontal line between line Ch1 824a and line Ch2 824b may change position.

If the finger gesture is a vertical pinch open gesture input 814 as depicted in FIG. 8, then all image mesh 812a vertices on line Ch1 824a may move up towards line Ch1−1 824c by a value equal to the level of the vertical caricature action (e.g., CLv) multiplied by the current distance between line Ch1 824a and line Ch1−1 824c as depicted in the distorted image mesh 812b. Similarly, all vertices on the line Ch2 824b may move down towards line Ch2+1 824d by a value equal to the level of the vertical caricature action (e.g., CLv) multiplied by the current distance between line Ch2 824b and line Ch2+1 824d as depicted in the distorted image mesh 812b. Meanwhile, the new locations of the vertices on horizontal lines between line Ch1 824a and line Ch2 824b may be determined by linear interpolation from the new locations of the vertices on line Ch1 824a and those on line Ch2 824b.

Figure 9:
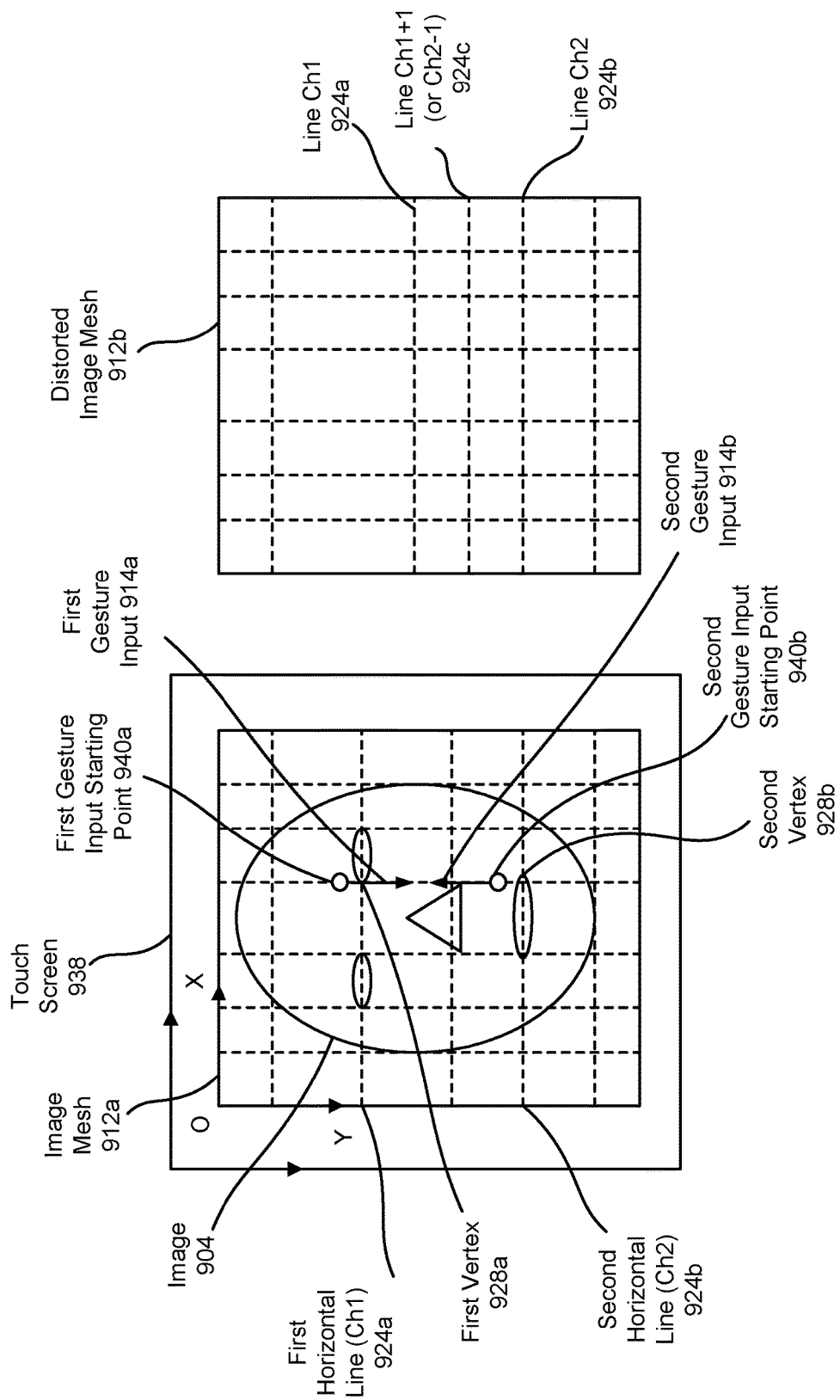
FIG. 9 illustrates an example of a vertical pinch close gesture input.

FIG. 9 illustrates an example of a vertical pinch close gesture input. More specifically, FIG. 9 illustrates a vertical pinch close gesture input (left image) and a distorted image mesh 912b resulting from the corresponding caricature action 118 (right image). As described above, in some implementations, a touch screen 938 may be coupled to the electronic device 102. In this example, a vertical pinch close gesture input may include multiple gesture inputs 914a-b to generate a caricature image 122.

In this example, a first gesture input starting point 940a (e.g., a fingertip starting position on the touch screen 938) may be mapped to a first vertex 928a with coordinates (X1start, Y1start) and a second gesture input starting point 940b may be mapped to a second vertex 928b with coordinates (X2start, Y2start) on the image coordinate system for the interpretation of a caricature action 118. The first vertex 928a and the second vertex 928b may correspond to feature locations 108 of the image 904. For example, the first vertex 928a may correspond to the inner corner of the right eye and the second vertex 928b may correspond to the right corner of the mouth. As described above, a caricature action 118 contains information about which vertices of the image mesh 912a may change locations. It should be noted that, as depicted in FIG. 9, the gesture input starting points 940a-b may not exactly line up with the vertices 928a-b. In this example, the gesture input starting points 940a-b may be mapped to the vertices 928a-b that are closest to the gesture input starting points 940a-b. In another example, the gesture input starting points 940a-b may be mapped to the vertical line that is closest to the gesture input starting points 940a-b.

A vertical caricature action 118 may include four elements, a caricature direction (e.g., Cd), an index (e.g., Ch1)

of the first (from top) affected horizontal line 924a in the image mesh 912a, an index (e.g., Ch2) of the last (from top) affected horizontal line 924b (e.g., Ch2) and a predefined vertical caricaturing level with a value between 0 and 1. For simplicity, in FIG. 9, the horizontal lines may be referred to by their indices.

For a vertical caricature action 118, assuming Y1start is greater than Y2start, then line Ch1 924a may be the horizontal line closest to Y1start and line Ch2 924b may be the horizontal line closest to Y2start. In this example, the vertices on line Ch1 924a (which may include the first vertex 928a) and the vertices on line Ch2 924b (which may include the second vertex 928b) and the vertices on the horizontal line between line Ch1 924a and line Ch2 924 may change position.

If the finger gesture is a vertical pinch close gesture input 914 as depicted in FIG. 9, then all image mesh 912a vertices on line Ch1 924a may move down towards line Ch1+1 924c by a value equal to the level of the vertical caricature action (e.g., CLv) multiplied by the current distance between line Ch1 924a and line Ch1+1 924c as depicted in the distorted image mesh 912b. Similarly, all vertices on the line Ch2 924b may move up towards line Ch2−1 by a value equal to the level of the vertical caricature action (e.g., CLv) multiplied by the current distance between line Ch2 924b and line Ch2−1 as depicted in the distorted image mesh 912b. As depicted in FIG. 9, line Ch2−1 may be the same as line Ch1+1 924c. In other words, all vertices on the line Ch2 924b may move up towards line Ch1+1 924c by a value equal to the level of the vertical caricature action (e.g., CLv) multiplied by the current distance between line Ch2 924b and the line Ch1+1 924c as depicted in the distorted image mesh 912b. Meanwhile, the new locations of the vertices on the horizontal lines between line Ch1 924a and line Ch2 924b may be determined by linear interpolation from the new locations of the vertices on line Ch1 924a and those on line Ch2 924b.

Figure 10:
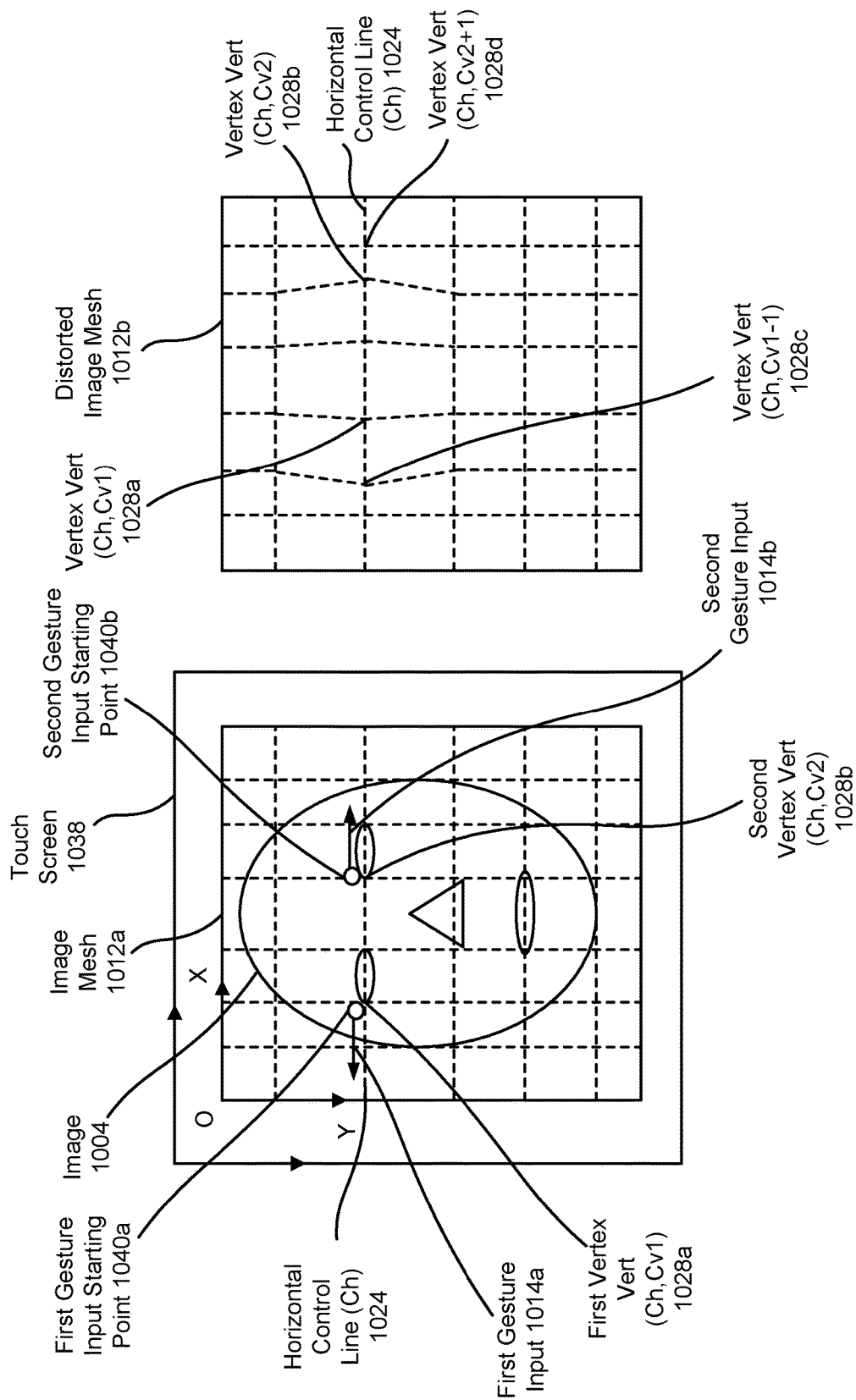
FIG. 10 illustrates an example of a horizontal pinch open gesture input.

FIG. 10 illustrates an example of a horizontal pinch open gesture input. More specifically, FIG. 10 illustrates a horizontal pinch open gesture input (left image) and a distorted image mesh 1012b resulting from the corresponding caricaturing action 118 (right image). As described above, in some implementations, a touch screen 1038 may be coupled to the electronic device 102. In this example, a horizontal pinch open gesture input may include multiple gesture inputs 1014a-b to generate a caricature image 122.

In this example, a first gesture input starting point 1040a (e.g., a fingertip starting position on the touch screen 1038) may be mapped to a first vertex 1028a and a second gesture input starting point 1040b may be mapped to a second vertex 1028b on the image coordinate system for the interpretation of a caricature action 118. The first vertex 1028a and the second vertex 1028b may correspond to feature locations 108 of the image 1004. For example, the first vertex 1028a may correspond to the outer corner of the left eye and the second vertex 1028b may correspond to the inner corner of the right eye. As described above, a caricature action 118 contains information about which vertices of the image mesh 1012a may change locations. It should be noted that, as depicted in FIG. 10, the gesture input starting points 1040a-b may not exactly line up with the vertices 1028a-b. In this example, the gesture input starting points 1040a-b may be mapped to the vertices 1028a-b that are closest to the gesture input starting points 1040a-b.

A horizontal caricature action 118 may include five elements: a caricature direction (e.g. Cd), an index (e.g., Ch) of the affected horizontal control line 1024, an index (e.g., Cv1) of the first affected vertex 1028a on the horizontal control line 1024, an index (e.g., Cv2) of the last affected vertex 1028b on the horizontal control line 1024 and a predefined horizontal caricaturing level (e.g., CLh). In this example, the caricature direction may be horizontal and the affected horizontal control line 1024 may be the horizontal line closest to the midpoint (e.g., in the vertical direction) of the starting points 1040a-b of the gesture inputs. For simplicity, in FIG. 10, the lines may be referred to by their corresponding index.

In some implementations, vertex Cv1 1028a and vertex Cv2 1028b may be defined as the two vertices that are closest to the first gesture input starting point 1040a (e.g., X1start, Y1start) and the second gesture input starting point 1040b (e.g., X2start, Y2start). Vertex Cv1 1028a and vertex Cv2 1028b may also be defined as two specific vertices regardless of the locations of the gesture input starting points 1040a-b. For example, if line Ch 1024 is line H2 which connects two eyes, vertex Cv1 1028a may be defined as Vert (H2,V2) and vertex Cv2 1028b may be defined as Vert (H2,V5), which correspond to the outer eye corner of the left eye, and the inner corner of the right eye. For simplicity, in FIG. 10, vertices may be referred to by their corresponding index. For example the first vertex 1028a and the second vertex 1028b may be referred to as vertex Vert (Ch, Cv1) 1028a and the second vertex 1028b may be referred to as vertex Vert (Ch, Cv2) 1028b, respectively. References to other vertices may similarly be based on the vertex index. In some implementations, for horizontal caricaturing, only the vertices on the horizontal control line 1024 may change position. In other words, only vertices defined as Vert (Ch, Cv1), Vert (Ch, Cv1+1), . . . , Vert (Ch, Cv2) may change their locations.

If the finger gesture is a horizontal pinch open gesture input 1014 as depicted in FIG. 10, then vertex Vert (Ch, Cv1) 1028a may move left by a value equal to the level of the horizontal caricature action (e.g., CLh) multiplied by the current distance between vertex Vert (Ch, Cv1) 1028a and vertex Vert (Ch, Cv1−1) 1028c as depicted in the distorted image mesh 1012b. Similarly, vertex Vert (Ch, Cv2) 1028b may move right by an amount equal to the level of the horizontal caricature action (e.g., CLh) multiplied by the current distance between vertex Vert (Ch, Cv2) 1028b and vertex Vert (Ch, Cv2+1) 1028d as depicted in the distorted image mesh 1012b. Meanwhile, the new locations of vertices Vert (Ch, Cv1+1), . . . , Vert (Ch, Cv2−1), may be determined by linear interpolation from the new locations of vertex Vert (Ch, Cv1) 1028a and vertex Vert (Ch, Cv2) 1028b. As depicted in FIG. 10, the vertices on the horizontal lines other than the horizontal control line 1024 may not move location. The location of these vertices may remain the intersection points between horizontal lines and the vertical lines that are perpendicular to the horizontal lines.

Figure 11:
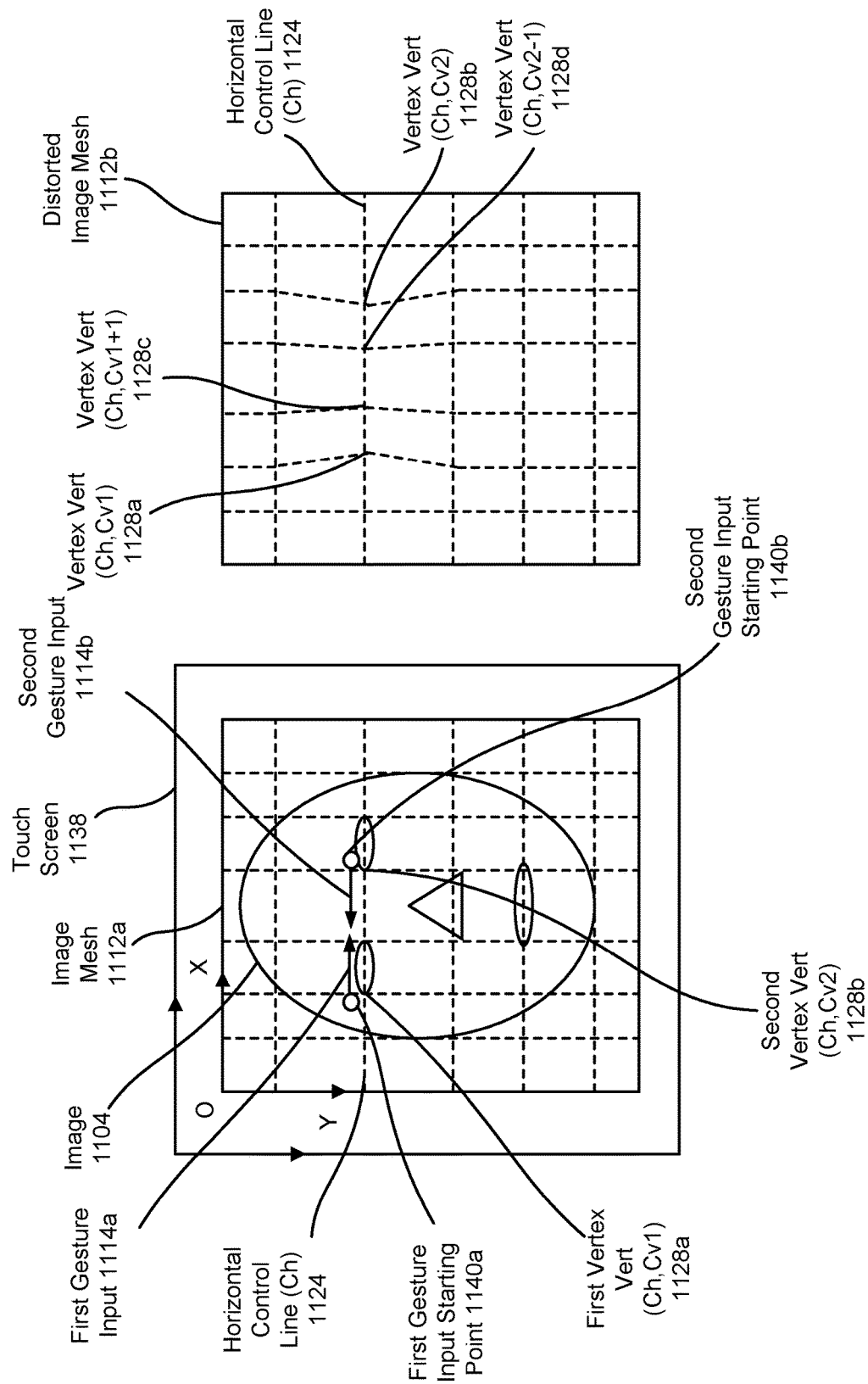
FIG. 11 illustrates an example of a horizontal pinch close gesture input.

FIG. 11 illustrates an example of a horizontal pinch close gesture input. More specifically, FIG. 11 illustrates a horizontal pinch close gesture input (left image) and a distorted image mesh 1112b resulting from the corresponding caricaturing action 118 (right image). As described above, in some implementations, a touch screen 1138 may be coupled to the electronic device 102. In this example, a horizontal pinch open gesture input may include multiple gesture inputs 1114a-b to generate a caricature image 122.

In this example, a first gesture input starting point 1140a (e.g., a fingertip starting position on the touch screen 1138) may be mapped to a first vertex 1128a and a second gesture input starting point 1140b may be mapped to a second vertex 1128b on the image coordinate system for the interpretation of a caricature action 118. The first vertex 1128a and the second vertex 1128b may correspond to feature locations 118 of the image 1104. For example, the first vertex 1128a may correspond to the outer corner of the left eye and the second vertex 1128b may correspond to the inner corner of the right eye. As described above, a caricature action 118 contains information about which vertices of the image mesh 1112a may change locations. It should be noted that, as depicted in FIG. 11, the gesture input starting points 1140a-b may not exactly line up with the vertices 1128a-b. In this example, the gesture input starting points 1140a-b may be mapped to the vertices 1128a-b that are closest to the gesture input starting points 1140a-b.

A horizontal caricature action 118 may include five elements: a caricature direction (e.g. Cd), an index (e.g., Ch) of the affected horizontal control line 1124, an index (e.g., Cv1) of the first affected vertex 1128a on the horizontal control line 1124, an index (e.g., Cv2) of the last affected vertex 1128b on the horizontal control line 1124 and a predefined horizontal caricaturing level (e.g., CLh). In this example, the caricature direction may be horizontal and the affected horizontal control line 1124 may be the horizontal line closest to the midpoint (e.g., in the vertical direction) of the starting points 1140a-b of the gesture inputs. For simplicity, in FIG. 11, the lines may be referred to by their corresponding index.

In some implementations, vertex Cv1 1128a and vertex Cv2 1128b may be defined as the two vertices that are closest to the first gesture input starting point 1140a (e.g., X1start, Y1start) and the second gesture input starting point 1140b (e.g., X2start, Y2start). Vertex Cv1 1128a and vertex Cv2 1128b may also be defined as two specific vertices regardless of the locations of the gesture input starting points 1140a-b. For example, if line Ch 1124 is line H2 which connects two eyes, vertex Cv1 1128a may be defined as Vert (H2,V2) and vertex Cv2 1128b may be defined as Vert (H2,V5), which correspond to the outer eye corner of the left eye and the inner corner of the right eye. For simplicity, in FIG. 11, vertices may be referred to by their corresponding index. For example the first vertex 1128a may be referred to as vertex Vert (Ch, Cv1) 1128a and the second vertex 1128b may be referred to as vertex Vert (Ch, Cv2) 1128b, respectively. References to other vertices may similarly be based on the vertex index. In some implementations, for horizontal caricaturing, only the vertices on the horizontal control line 1124 may change position. In other words, only vertices defined as Vert (Ch, Cv1), Vert (Ch, Cv1+1), . . . , Vert (Ch, Cv2) may change their locations.

If the finger gesture is a horizontal pinch close gesture input 1114 as depicted in FIG. 11, then vertex Vert (Ch, Cv1) 1128a may move right by a value equal to the level of the horizontal caricature action (e.g., CLh) multiplied by the current distance between vertex Vert (Ch, Cv1) 1128a and vertex Vert (Ch, Cv1+1) 1128c as depicted in the distorted image mesh 1112b. Similarly, vertex Vert (Ch, Cv2) 1128b may move left by an amount equal to the level of the caricature action (e.g., CLh) multiplied by the current distance between vertex Vert (Ch, Cv2) 1128b and vertex Vert (Ch, Cv2−1) 1128d as depicted in the distorted image mesh 1112b. Meanwhile, the new locations of vertices Vert (Ch, Cv1+1), . . . , Vert (Ch, Cv2−1), may be determined by linear interpolation from the new locations of vertex Vert (Ch, Cv1) 1128a and vertex Vert (Ch, Cv2) 1128b. As depicted in FIG. 11, the vertices on the horizontal lines other than the horizontal control line 1124 may not move location. The location of these vertices may remain the intersection points between horizontal lines and the vertical lines that are perpendicular to the horizontal lines.

Figure 12:
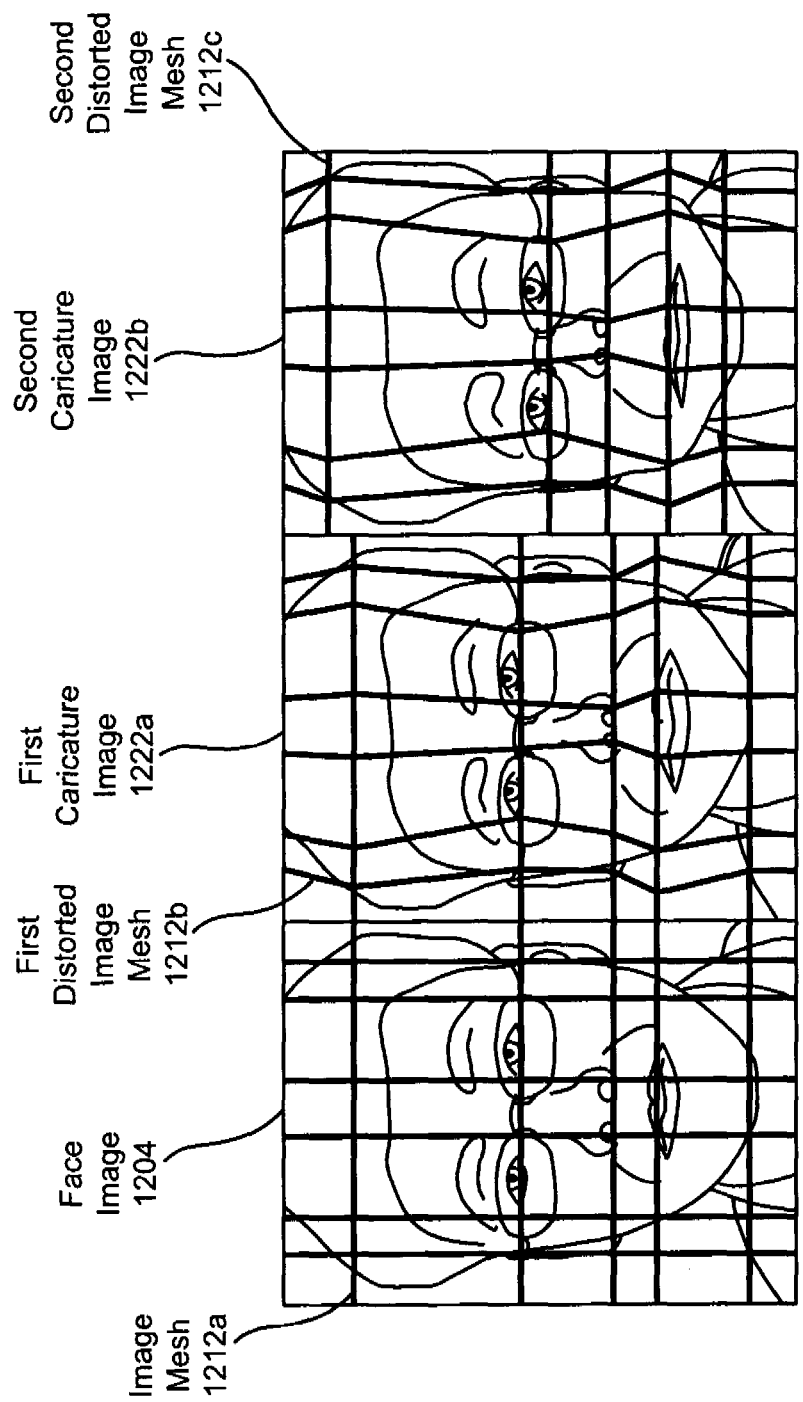
FIG. 12 illustrates another example of a face image and examples of caricature images that may be generated using the systems and methods disclosed herein.

FIG. 12 illustrates another example of a face image 1204 and examples of caricature images 1222a-b that may be generated using the systems and methods disclosed herein. As described above, in some implementations a display 536 coupled to the electronic device 102 may present the face image 1204 and an image mesh 1212a in a mesh-based model.

A first caricature image 1222a may be generated based on a first set of caricature actions 118 and the face image 1204. In this example, a first set of gesture inputs 114 may indicate the first set of caricature actions 118 as described herein. FIG. 12 also depicts a first distorted image mesh 1212b. The first distorted image mesh 1212b may indicate the change in position of one or more vertices after a series of horizontal pinch actions on the forehead, the eyes, the nose, the mouth, etc. of the face image 1204, as illustrated in the middle image. As described above, the first set of caricature actions 118 may be appended to the caricature action list 534. The caricature action list 534 may determine the mappings between the location of every image mesh 1212a vertex in the face image 1204 and its new location in the first caricature image 1222a. Based on this vertex mapping, a mapping for each of the non-vertex pixels in the first caricature image 1222a and their original locations in the face image 1204 may be computed. The color of these pixels may then be obtained.

A second caricature image 1222b may be generated based on a second set of caricature actions 118 and the first caricature image 1222a. In this example, a second set of gesture inputs 114 may indicate the second set of caricature actions 118 as described herein. FIG. 12 also depicts a second distorted image mesh 1212c. The second distorted image mesh 1212c may indicate the change in position of one or more vertices after a series of vertical pinch actions further applied on the forehead, the chin, etc. of the first caricature image 1222a, as illustrated in the right image. As described above, the second set of caricature actions 118 may be appended to the caricature action list 534 (e.g., which may contain the first set of caricature actions 118). It should be noted that the each caricature image 1222a-b may be a result of the previous caricature actions 118. For example, the second caricature image 1222b may be a result of the first and second set of caricature actions 118 being applied to the face image 1204.

In some implementations, to apply the caricature actions 118 (e.g., the first set of caricature actions 118 and the second set of caricature actions 118), the new locations of all vertices due to the combined caricature actions 118 may be computed. A single texture warping (based on both the first set of caricature actions 118 and the second set of caricature actions 118) may then be applied once on the face image 1204.

Figure 13:
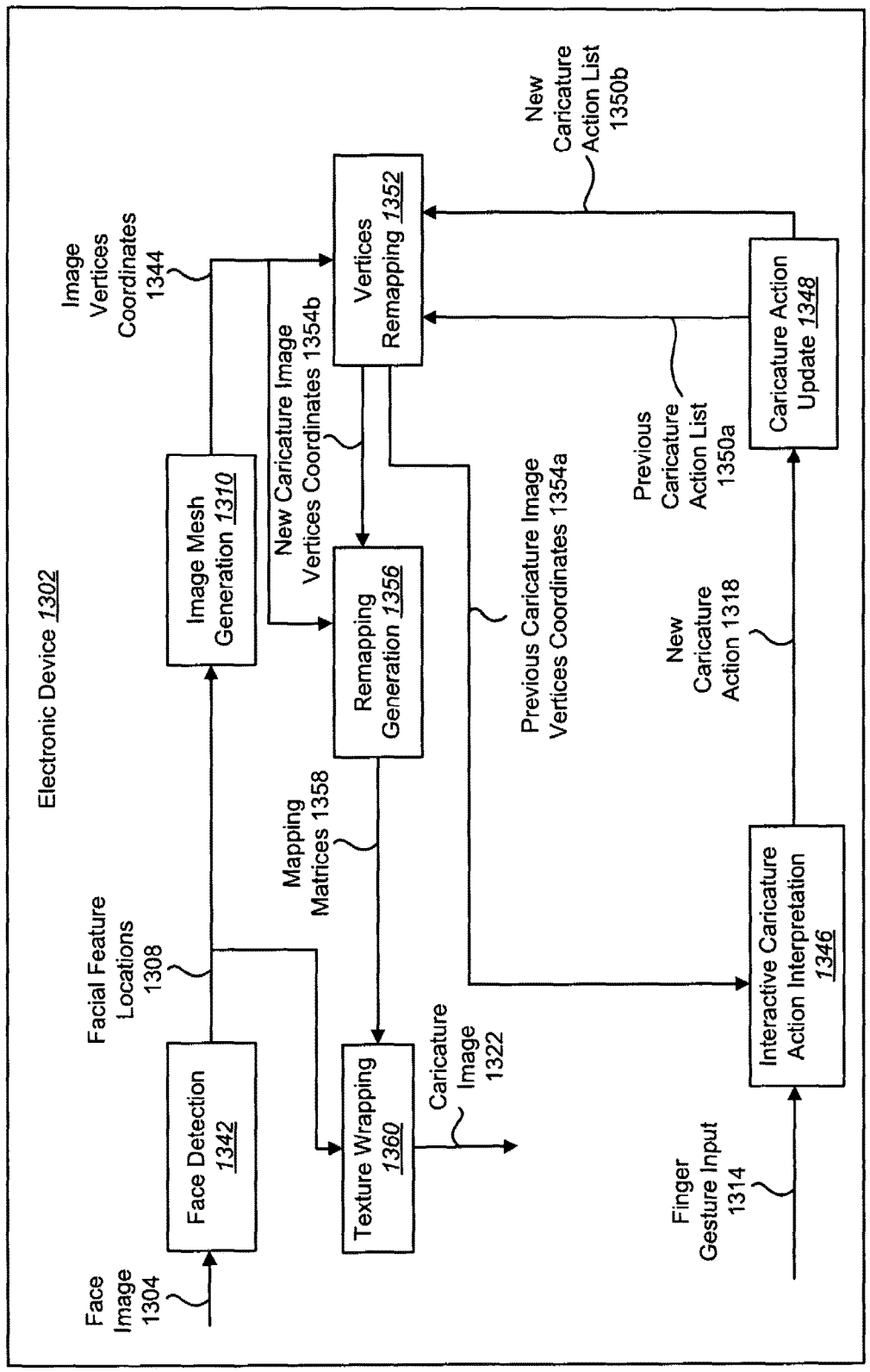
FIG. 13 is a block diagram illustrating a more specific configuration of an electronic device in which systems and methods for interactive image caricaturing may be implemented.

FIG. 13 is a block diagram illustrating a more specific configuration of an electronic device 1302 in which systems and methods for interactive image caricaturing may be implemented. The electronic device 1302 may be an example of the electronic device 102 described in connection with FIG. 1. The electronic device 1302 may receive a face image 1304 that may be an example of the image 104 described in connection with FIG. 1. For example, the face image 1304 may be a previously caricatured face image. In one implementation, the face image 1304 may be provided to a face detection block/module 1342 that may include all or part of the functionality of the feature location detection block/module 106 described in connection with FIG. 1. For example, the face detection block/module 1342 may detect facial feature locations 1308 that may be examples of the feature locations 108 described in connection with FIG. 1. The facial feature locations 1308 may be provided to an image mesh generation block/module 1310 that may be an example of the image mesh generation block/module 110 described in connection with FIG. 1. In this implementation, the image mesh generation block/module 1310 may generate image vertices coordinates 1344 that indicate the locations of the vertices of the image mesh that correspond to the facial feature locations 1308. The image vertices coordinates 1344 may be defined based on the indices of the horizontal line and vertical line that intersect at the vertex (e.g., H1, V2).

The electronic device 1302 may receive a finger gesture input 1314 that may be an example of the gesture input 114 described in connection with FIG. 1. The finger gesture input 1314 may be provided to an interactive caricature action interpretation block/module 1346 that may include all or part of the functionality of the caricature action determination block/module 116 described in connection with FIG. 1. For example, the interactive caricature action interpretation block/module 1346 may determine a new caricature action 1318 based on the finger gesture input 1314.

The new caricature action 1318 may be provided to a caricature action update block/module 1348 that may update the caricature action list. As described above, the electronic device 1302 may maintain a caricature action list that contains a list of all the caricature actions that have been determined. A previous caricature action list 1350a that contains a list of all previous caricature actions that may have been applied to the face image 1304 (or previously generated caricature image), may be provided to the vertices remapping block/module 1352 to be used to generate caricature image vertices coordinates. In some implementations, the previous caricature action list 1350a may not include the new caricature action 1318 (e.g., the caricature action currently being determined).

The vertices remapping block/module 1352 may determine previous caricature image vertices coordinates 1354a based on the previous caricature action list 1350a and the image vertices coordinates 1344. The previous caricature action list 1350a and the previous caricature image vertices 1354a may pertain to a previous caricature action that was determined (in a previous instance of the method 200 for example). In some implementations, the previous caricature image vertices coordinates 1354a may be provided to the interactive caricature action interpretation block/module 1346 to assist in determining a new caricature action 1318.

In some implementations, the caricature action update block/module 1348 may add the new caricature action 1318 to the caricature action list (that includes any caricature actions that have been previously determined) to generate a new caricature action list 1350b. The new caricature action list 1350b may be provided to the vertices remapping block/module 1352. The image vertices coordinates 1344 may also be passed to the vertices remapping block/module 1352.

In some implementations, the vertices remapping block/module 1352 may determine new caricature image vertices coordinates 1354b based on the new caricature action list 1350b and the image vertices coordinates 1344. For example, the vertices remapping block/module 1352 may determine the location (in the caricature image 1322) of the vertices of the face image 1304 based on the new caricature action list 1350b (which may include previously determined caricature actions and the new caricature action 1318).

The new caricature image vertices coordinates 1354b may be passed to a remapping generation block/module 1356. The remapping generation block/module 1356 may also receive the image vertices coordinates 1344. The remapping generation block/module 1356 may generate a mapping between the image vertices coordinates 1344 and the new caricature image vertices coordinates 1354b. The output of the remapping generation block/module 1356 may be one or more mapping matrices 1358 that reflect the relationship between the change in position of the image vertices and the caricature image vertices (e.g., based on their coordinates).

The mapping matrices 1358 and the face image 1304 may be provided to a texture warping block/module 1360 that performs a texture warping of the face image 1304. For example, the texture warping block/module 1360 may change the position of one or more pixels in the face image 1304 to generate a caricature image 1322.

Figure 14:
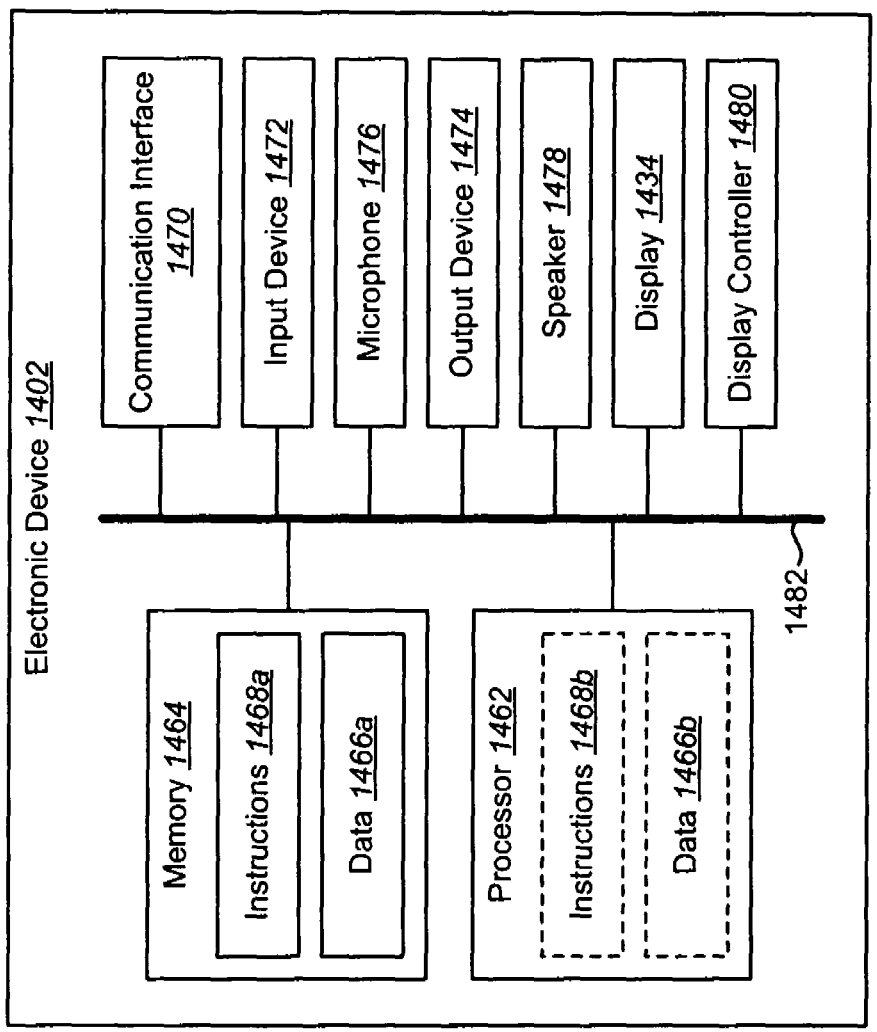
FIG. 14 illustrates various components that may be utilized in an electronic device.

FIG. 14 illustrates various components that may be utilized in an electronic device 1402. The illustrated components may be located within the same physical structure or in separate housings or structures. The electronic device 1402 described in connection with FIG. 14 may be implemented in accordance with one or more of the electronic devices described herein. The electronic device 1402 includes a processor 1462. The processor 1462 may be a general purpose single- or multi-chip microprocessor (e.g., an ARM), a special purpose microprocessor (e.g., a digital signal processor (DSP)), a microcontroller, a programmable gate array, etc. The processor 1462 may be referred to as a central processing unit (CPU). Although just a single processor 1462 is shown in the electronic device 1402 of FIG. 14, in an alternative configuration, a combination of processors (e.g., an ARM and DSP) could be used.

The electronic device 1402 also includes memory 1464 in electronic communication with the processor 1462. That is, the processor 1462 can read information from and/or write information to the memory 1464. The memory 1464 may be any electronic component capable of storing electronic information. The memory 1464 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1466a and instructions 1468a may be stored in the memory 1464. The instructions 1468a may include one or more programs, routines, sub-routines, functions, procedures, etc. The instructions 1468a may include a single computer-readable statement or many computer-readable statements. The instructions 1468a may be executable by the processor 1462 to implement one or more of the methods, functions and procedures described above. Executing the instructions 1468a may involve the use of the data 1466a that is stored in the memory 1464. FIG. 14 shows some instructions 1468b and data 1466b being loaded into the processor 1462 (which may come from instructions 1468a and data 1466a).

The electronic device 1402 may also include one or more communication interfaces 1470 for communicating with other electronic devices. The communication interfaces 1470 may be based on wired communication technology, wireless communication technology, or both. Examples of different types of communication interfaces 1470 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1402 may also include one or more input devices 1472 and one or more output devices 1474. Examples of different kinds of input devices 1472 include a keyboard, mouse, microphone, remote control device, button, joystick, trackball, touchpad, lightpen, etc. For instance, the electronic device 1402 may include one or more microphones 1476 for capturing acoustic signals. In one configuration, a microphone 1476 may be a transducer that converts acoustic signals (e.g., voice, speech) into electrical or electronic signals. Examples of different kinds of output devices 1474 include a speaker, printer, etc. For instance, the electronic device 1402 may include one or more speakers 1478. In one configuration, a speaker 1478 may be a transducer that converts electrical or electronic signals into acoustic signals. One specific type of output device which may be typically included in an electronic device 1402 is a display device 1434. Display devices 1434 used with configurations disclosed herein may utilize any suitable image projection technology, such as a liquid crystal display (LCD), light-emitting diode (LED), gas plasma, electroluminescence, cathode ray tube (CRT) or the like. A display controller 1480 may also be provided, for converting data stored in the memory 1464 into text, graphics, and/or moving images (as appropriate) shown on the display device 1434.

The various components of the electronic device 1402 may be coupled together by one or more buses, which may include a power bus, a control signal bus, a status signal bus, a data bus, etc. For simplicity, the various buses are illustrated in FIG. 14 as a bus system 1482. It should be noted that FIG. 14 illustrates only one possible configuration of an electronic device 1402. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein. In some configurations, one or more subsets or portions of the functions or procedures disclosed herein may be applied independently of other functions or procedures disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for interactive image caricaturing by an electronic device, comprising:
   detecting at least one feature location of an image;
   generating, based on the at least one feature location, an image mesh that comprises a grid of at least one horizontal line and at least one vertical line, wherein at least one vertex of the image mesh corresponds to a feature location of a facial component in the image;
   obtaining at least one gesture input;
   determining at least one caricature action based on the at least one gesture input, wherein the caricature action provides a pixel map that maps an image vertex pixel of the at least one vertex to a corresponding caricature image vertex pixel; and
   generating a caricature image based on the image mesh, the at least one caricature action and the image.

2. The method of claim 1, wherein the image is a face image.

3. The method of claim 1, wherein the at least one gesture input comprises a touch input.

4. The method of claim 1, further comprising displaying at least one of the image and the caricature image.

5. The method of claim 1, wherein generating a caricature image comprises applying the at least one caricature action to the image.

6. The method of claim 5, wherein the at least one caricature action provides shifting information for the at least one vertex of the image mesh and provides the pixel map that maps the image vertex pixel to the corresponding caricature image vertex pixel based on the shifting information, and wherein generating the caricature image comprises interpolating a location of other pixels in the caricature image based on the pixel map.

7. The method of claim 1, further comprising validating the at least one gesture input.

8. The method of claim 7, wherein validating the at least one gesture input comprises determining whether a motion of the gesture input is greater than a motion threshold.

9. The method of claim 1, further comprising maintaining a caricature action list.

10. The method of claim 9, further comprising adding the at least one caricature action to the caricature action list.

11. The method of claim 1, wherein the at least one gesture input comprises multiple gesture inputs.

12. The method of claim 11, further comprising determining a motion of the gesture inputs relative to one another.

13. The method of claim 11, further comprising determining that the gesture inputs are horizontally aligned.

14. The method of claim 11, further comprising determining that the gesture inputs are vertically aligned.

15. An electronic device for interactive image caricaturing, comprising:
feature location detection circuitry configured to detect at least one feature location of an image;
image mesh generation circuitry coupled to the feature location detection circuitry, wherein the image mesh generation circuitry is configured to generate, based on the at least one feature location, an image mesh that comprises a grid of at least one horizontal line and at least one vertical line, wherein at least one vertex of the image mesh corresponds to a feature location of a facial component in the image;
sensing circuitry configured to obtain at least one gesture input;
caricature action determination circuitry coupled to the sensing circuitry, wherein the caricature action determination circuitry is configured to determine at least one caricature action based on the at least one gesture input, wherein the caricature action provides a pixel map that maps an image vertex pixel of the at least one vertex to a corresponding caricature image vertex pixel; and
caricature image generation circuitry coupled to the image mesh generation circuitry and the caricature action determination circuitry, wherein the caricature image generation circuitry is configured to generate a caricature image based on the image mesh, the at least one caricature action and the image.

16. The electronic device of claim 15, wherein the image is a face image.

17. The electronic device of claim 15, wherein the at least one gesture input comprises a touch input.

18. The electronic device of claim 15, further comprising a display that is coupled to the caricature image generation circuitry and configured to display at least one of the image and the caricature image.

19. The electronic device of claim 15, wherein generating a caricature image comprises applying the at least one caricature action to the image.

20. The electronic device of claim 19, wherein the at least one caricature action provides shifting information for the at least one vertex of the image mesh and provides the pixel map that maps the image vertex pixel to the corresponding caricature image vertex pixel based on the shifting information, and wherein generating the caricature image comprises interpolating a location of other pixels in the caricature image based on the pixel map.

21. The electronic device of claim 15, further comprising gesture input validation circuitry coupled to the sensing circuitry, wherein the gesture input validation circuitry is configured to validate the at least one gesture input.

22. The electronic device of claim 21, wherein validating the at least one gesture input comprises determining whether a motion of the gesture input is greater than a motion threshold value.

23. The electronic device of claim 15, wherein the electronic device is configured to maintain a caricature action list.

24. The electronic device of claim 23, wherein the electronic device is configured to add the at least one caricature action to the caricature action list.

25. The electronic device of claim 15, wherein the at least one gesture input comprises multiple gesture inputs.

26. The electronic device of claim 25, further comprising gesture input validation circuitry configured to determine a motion of the gesture inputs relative to one another.

27. The electronic device of claim 25, further comprising gesture input validation circuitry configured to determine that the gesture inputs are horizontally aligned.

28. The electronic device of claim 25, further comprising gesture input validation circuitry configured to determine that the gesture inputs are vertically aligned.

29. A non-transitory tangible computer-readable medium having instructions thereon, the instructions comprising:
code for causing an electronic device to detect at least one feature location of an image;
code for causing the electronic device to generate, based on the at least one feature location, an image mesh that comprises a grid of at least one horizontal line and at least one vertical line, wherein at least one vertex of the image mesh corresponds to a feature location of a facial component in the image;
code for causing the electronic device to obtain at least one gesture input;
code for causing the electronic device to determine at least one caricature action based on the at least one gesture input, wherein the caricature action provides a pixel map that maps an image vertex pixel of the at least one vertex to a corresponding caricature image vertex pixel; and
code for causing the electronic device to generate a caricature image based on the image mesh, the at least one caricature action and the image.

30. The computer-readable medium of claim 29, wherein the image is a face image.

31. The computer-readable medium of claim 29, wherein the at least one gesture input comprises a touch input.

32. The computer-readable medium of claim 29, wherein the instructions further comprise code for causing the electronic device to display at least one of the image and the caricature image.

33. The computer-readable medium of claim 29, wherein the code for causing the electronic device to generate a caricature image comprises code for causing the electronic device to apply the at least one caricature action to the image.

34. The computer-readable medium of claim 29, wherein the instructions further comprise code for causing the electronic device to validate the at least one gesture input.

35. The computer-readable medium of claim 29, wherein the at least one gesture input comprises multiple gesture inputs.

36. The computer-readable medium of claim 29, wherein the instructions further comprise code for causing the electronic device to maintain a caricature action list.

37. The computer-readable medium of claim 36, wherein the instructions further comprise code for causing the electronic device to add the at least one caricature action to the caricature action list.

38. An apparatus for interactive image caricaturing, comprising:
    means for detecting at least one feature location of an image;
    means for generating, based on the at least one feature location, an image mesh that comprises a grid of at least one horizontal line and at least one vertical line, wherein at least one vertex of the image mesh corresponds to a feature location of a facial component of the image;
    means for obtaining at least one gesture input;
    means for determining at least one caricature action based on the at least one gesture input, wherein the caricature action provides a pixel map that maps an image vertex pixel of the at least one vertex to a corresponding caricature image vertex pixel; and
    means for generating a caricature image based on the image mesh, the at least one caricature action and the image.

39. The apparatus of claim 38, wherein the image is a face image.

40. The apparatus of claim 38, wherein the at least one gesture input comprises a touch input.

41. The apparatus of claim 38, further comprising means for displaying at least one of the image and the caricature image.

42. The apparatus of claim 38, wherein the means for generating a caricature image comprises means for applying the at least one caricature action to the image.

43. The apparatus of claim 38, further comprising means for validating the at least one gesture input.

44. The apparatus of claim 38, wherein the at least one gesture input comprises multiple gesture inputs.

45. The apparatus of claim 38, further comprising means for maintaining a caricature action list.

46. The apparatus of claim 45, further comprising means for adding the at least one caricature action to the caricature action list.

\* \* \* \* \*